United States Patent
Kim et al.

(10) Patent No.: US 11,996,024 B2
(45) Date of Patent: May 28, 2024

(54) DISPLAY DEVICE AND OPERATING METHOD THEREOF

(71) Applicant: SAMSUNG ELECTRONICS CO., LTD., Suwon-si (KR)

(72) Inventors: Jonghwan Kim, Suwon-si (KR); Guiwon Seo, Suwon-si (KR); Chun Zhao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 49 days.

(21) Appl. No.: 17/741,573

(22) Filed: May 11, 2022

(65) Prior Publication Data
US 2023/0066869 A1    Mar. 2, 2023

Related U.S. Application Data

(63) Continuation of application No. PCT/KR2022/005757, filed on Apr. 22, 2022.

(30) Foreign Application Priority Data

Aug. 31, 2021 (KR) .................. 10-2021-0115803

(51) Int. Cl.
*G09G 3/20* (2006.01)
*G06T 5/90* (2024.01)
(Continued)

(52) U.S. Cl.
CPC .......... *G09G 3/20* (2013.01); *G06T 5/90* (2024.01); *G06V 10/40* (2022.01); *G06V 10/774* (2022.01);
(Continued)

(58) Field of Classification Search
CPC ........ G09G 3/20; G06V 10/40; G06V 10/774; G06T 5/007
(Continued)

(56) References Cited

U.S. PATENT DOCUMENTS 8,339,475 B2  12/2012  Atanassov et al.
10,176,745 B2  1/2019  Kang
(Continued)

FOREIGN PATENT DOCUMENTS

JP         6386843        9/2018
KR  10-2010-0007748        1/2010
(Continued)

OTHER PUBLICATIONS

Na Tae Young et al. Method and Apparatus for Adjusting Output Characteristics of Video Jul. 11, 2019 SK Telecom Co Ltd [KR] KR20190083216 (A) paragrphs 3-86 English.*
(Continued)

*Primary Examiner* — Prabodh M Dharia
(74) *Attorney, Agent, or Firm* — STAAS & HALSEY LLP

(57) ABSTRACT

A display device including a processor configured to extract first through third feature information corresponding to a first image, each of a plurality of regions included in the first image, and object regions included in the first image, respectively. The processor is configured to obtain a first through third contrast ratio enhancement curves, corresponding to the first image, generated by applying the first feature information to a curve generation network in which first parameter information is set, corresponding to each of the plurality of regions, generated by applying the second feature information to the curve generation network in which second parameter information is set, corresponding to each of the plurality of object regions, generated by applying the third feature information to the curve generation network in which third parameter information is set, generate a second image by applying the first through third contrast ratio enhancement curves to the first image.

15 Claims, 14 Drawing Sheets

(51) Int. Cl.
*G06V 10/40* (2022.01)
*G06V 10/774* (2022.01)

(52) U.S. Cl.
CPC .............. *G06T 2207/20081* (2013.01); *G09G 2320/066* (2013.01)

(58) Field of Classification Search
USPC .......... 345/617, 694; 600/431, 414; 382/166
See application file for complete search history.

(56) References Cited

U.S. PATENT DOCUMENTS

| | | | |
|---|---|---|---|
| 10,542,242 B2 | 1/2020 | Lim et al. | |
| 2010/0007679 A1 | 1/2010 | Sakaigawa | |
| 2015/0031983 A1* | 1/2015 | Liang | A61B 5/055 600/414 |
| 2015/0043815 A1* | 2/2015 | Tan | H04N 19/124 382/166 |
| 2015/0245819 A1* | 9/2015 | Yoshiara | A61B 8/0866 600/431 |
| 2016/0117975 A1* | 4/2016 | Kang | H04N 5/202 345/694 |
| 2018/0132828 A1* | 5/2018 | Park | A61B 8/463 |
| 2019/0371268 A1 | 12/2019 | Lee et al. | |
| 2020/0009008 A1 | 1/2020 | Choi et al. | |
| 2020/0020303 A1 | 1/2020 | Kim et al. | |
| 2020/0364837 A1 | 11/2020 | Kim | |
| 2021/0342982 A1 | 11/2021 | Park et al. | |
| 2022/0318964 A1 | 10/2022 | Kim et al. | |

FOREIGN PATENT DOCUMENTS

| | | |
|---|---|---|
| KR | 10-1365369 | 3/2014 |
| KR | 10-2016-0048311 | 5/2016 |
| KR | 10-2017-0070715 | 6/2017 |
| KR | 10-2019-0083216 | 7/2019 |
| KR | 10-2019-0096859 | 8/2019 |
| KR | 10-1985880 | 9/2019 |
| KR | 10-2019-0135888 | 12/2019 |
| KR | 10-2020-0092492 | 8/2020 |
| KR | 10-2142019 | 9/2020 |
| KR | 10-2020-0132245 | 11/2020 |
| KR | 10-2021-0142755 | 11/2021 |

OTHER PUBLICATIONS

Na Tae Young et al. Method and Apparatus for Adjusting Output Characteristics of Video Jul. 11, 2019 SK Telecom Co Ltd [KR] KR20190083216 (A) paragrphs 3-86 Korean.*

International Search Report and Written Opinion dated Jul. 8, 2022 in International Patent Application No. PCT/KR2022/005757 (9 pages; 9 pages English Translation).

* cited by examiner

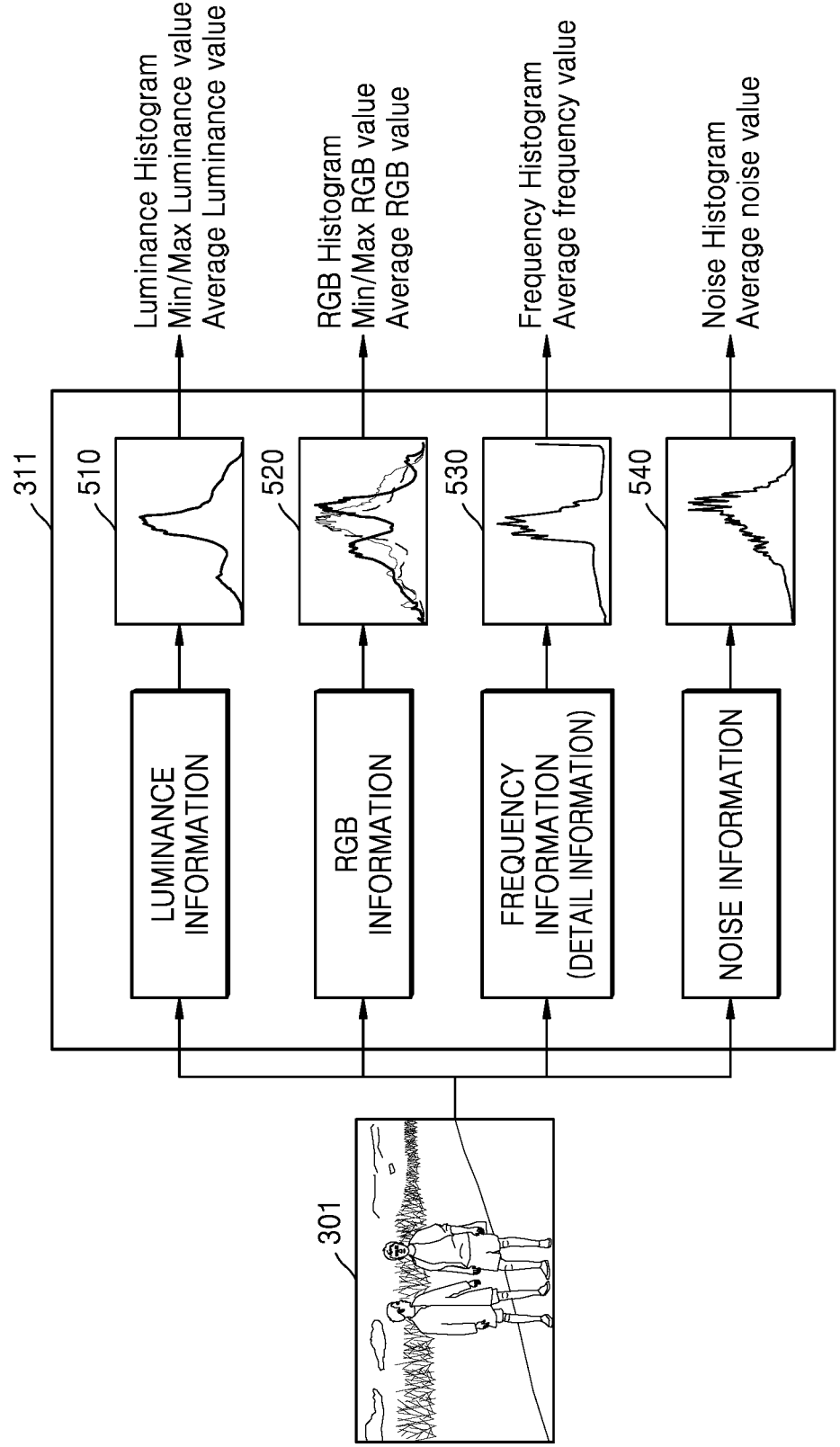

FIG. 6

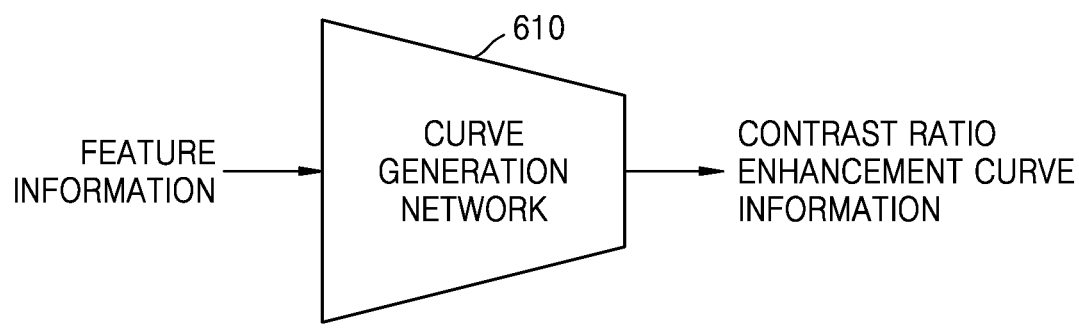

| INPUT | PARAMETER INFORMATION | OUTPUT |
|---|---|---|
| FIRST FEATURE INFORMATION (ENTIRE IMAGE) | FIRST PARAMETER INFORMATION | FIRST CONTRAST RATIO ENHANCEMENT CURVE (GLOBAL CONTRAST RATIO ENHANCEMENT CURVE) |
| SECOND FEATURE INFORMATION (FEATURE INFORMATION FOR EACH REGION) | SECOND PARAMETER INFORMATION | SECOND CONTRAST RATIO ENHANCEMENT CURVE (LOCAL CONTRAST RATIO ENHANCEMENT CURVE) |
| THIRD FEATURE INFORMATION (FEATURE INFORMATION FOR EACH OBJECT REGION) | THIRD PARAMETER INFORMATION | THIRD CONTRAST RATIO ENHANCEMENT CURVE (OBJECT CONTRAST RATIO ENHANCEMENT CURVE) |

DISPLAY DEVICE AND OPERATING METHOD THEREOF

CROSS REFERENCE TO THE RELATED APPLICATION

This application is a continuation application, under 35 U.S.C. § 111(a), of International Application No. PCT/KR2022/005757, filed Apr. 22, 2022 which claims priority to Korean patent application No. 10-2021-0115803, filed Aug. 31, 2021, the entire disclosures of all of which are herein incorporated by reference as a part of this application.

BACKGROUND

Field

Various embodiments relate to a display device and an operating method thereof. More particularly, the various embodiments relate to a display device for performing contrast ratio enhancement processing and an operating method of the display device.

Description of the Related Art

Display devices perform contrast ratio enhancement processing to enhance a contrast ratio of an image. The contrast ratio enhancement processing may be performed by analyzing information such as a luminance of the entire image to generate a global contrast ratio enhancement curve for gray scale representation enhancement, and applying the global contrast ratio enhancement curve to the entire image.

Alternatively, the contrast ratio enhancement processing may be performed by dividing an image into a plurality of regions having the same size, analyzing information such as a luminance of each region to generate a local contrast ratio enhancement curve, and applying the global contrast ratio enhancement curve and the local contrast ratio enhancement curve to each region. A method of applying both the local contrast ratio enhancement curve and the global contrast ratio enhancement curve achieves a more enhanced contrast ratio of an image than a method of applying only the global contrast ratio enhancement curve, but a performance difference in the contrast ratio enhancement is large according to the number and size of divided regions.

In addition, when a contrast ratio enhancement curve is generated by using an existing rule-based contrast ratio enhancement algorithm, an optimized contrast ratio enhancement algorithm may vary according to display characteristics. Accordingly, to generate an optimized contrast ratio enhancement curve, different contrast ratio enhancement algorithms may be installed in display devices having different display characteristics, and thus, product manufacturing costs may increase.

SUMMARY

According to an embodiment of the disclosure, a display device includes: a display; a memory storing one or more instructions; and a processor configured to execute the one or more instructions stored in the memory to extract first feature information corresponding to a first image, second feature information corresponding to each of a plurality of regions included in the first image, and third feature information corresponding to each of a plurality of object regions included in the first image. The processor is configured to obtain a first contrast ratio enhancement curve corresponding to the first image where the first contrast ratio enhancement curve is generated by applying the first feature information to a curve generation network in which first parameter information is set, obtain a second contrast ratio enhancement curve corresponding to each of the plurality of regions where the second contrast ratio enhancement curve is generated by applying the second feature information to the curve generation network in which second parameter information is set, obtain a third contrast ratio enhancement curve corresponding to each of the plurality of object regions where the third contrast ratio enhancement curve is generated by applying the third feature information to the curve generation network in which third parameter information is set. The processor is configured to generate a second image by applying the first contrast ratio enhancement curve, the second contrast ratio enhancement curve, and the third contrast ratio enhancement curve to the first image, and control the display to display the second image.

The processor may be further configured to execute the one or more instructions to extract one or more objects from the first image, and obtain the plurality of object regions included in the first image by dividing the first image into the plurality of object regions based on the extracted one or more objects.

The first feature information, the second feature information, and the third feature information may be determined based on at least one of luminance information, RGB information, frequency information, or noise information of pixels included in the first image.

The first parameter information, the second parameter information, and the third parameter information may be determined by training the curve generation network based on training data obtained using a contrast ratio enhancement algorithm according to a display characteristic of the display.

The training data may include feature information extracted from a plurality of training images, and contrast ratio enhancement curve information obtained by applying the contrast ratio enhancement algorithm to the plurality of training images.

The processor may be further configured to generate the second image by sequentially applying the first contrast ratio enhancement curve, the second contrast ratio enhancement curve, and the third contrast ratio enhancement curve to the first image.

The processor may be further configured to generate a fourth contrast ratio enhancement curve based on the first contrast ratio enhancement curve, the second contrast ratio enhancement curve, and the third contrast ratio enhancement curve, wherein the second image is generated by applying the fourth contrast ratio enhancement curve to the first image.

The processor may be further configured to generate the fourth contrast ratio enhancement curve by using a weighted average method to synthesize the first contrast ratio enhancement curve, the second contrast ratio enhancement curve, and the third contrast ratio enhancement curve.

The processor may be further configured to generate the fourth contrast ratio enhancement curve for each of the plurality of regions, generate a fifth contrast ratio enhancement curve by interpolating a fourth contrast ratio enhancement curve corresponding to a first region among the plurality of regions and a fourth contrast ratio enhancement curve corresponding to a second region adjacent to the first region, and generate the second image by applying the fifth contrast ratio enhancement curve to pixels in a boundary between the first region and the second region.

According to an embodiment of the disclosure, an operating method of a display device includes: receiving a first image, extracting first feature information corresponding to the first image, second feature information corresponding to each of a plurality of regions included in the first image, and third feature information corresponding to each of a plurality of object regions included in the first image; obtaining a first contrast ratio enhancement curve corresponding to the first image where the first contrast ratio enhancement curve is generated by applying the first feature information to a curve generation network in which first parameter information is set; obtaining a second contrast ratio enhancement curve corresponding to each of the plurality of regions where the second contrast ratio enhancement curve being generated by applying the second feature information and the curve generation network in which second parameter information is set; obtaining a third contrast ratio enhancement curve corresponding to each of the plurality of object regions where the third contrast ratio enhancement curve being generated by applying the third feature information and the curve generation network in which third parameter information is set; generating a second image by applying the first contrast ratio enhancement curve, the second contrast ratio enhancement curve, and the third contrast ratio enhancement curve to the first image; and displaying the second image.

BRIEF DESCRIPTION OF DRAWINGS

The above and/or other aspects of the disclosure will be more apparent by describing certain embodiments of the disclosure with reference to the accompanying drawings, in which:

FIGS. 4 and 5 are referenced to describe a method, performed by a feature information extractor, of extracting feature information, according to an embodiment of the disclosure.

FIGS. 6 and 7 are referenced to describe a method of generating a contrast ratio enhancement curve, according to an embodiment of the disclosure.

DETAILED DESCRIPTION

Figure 1:
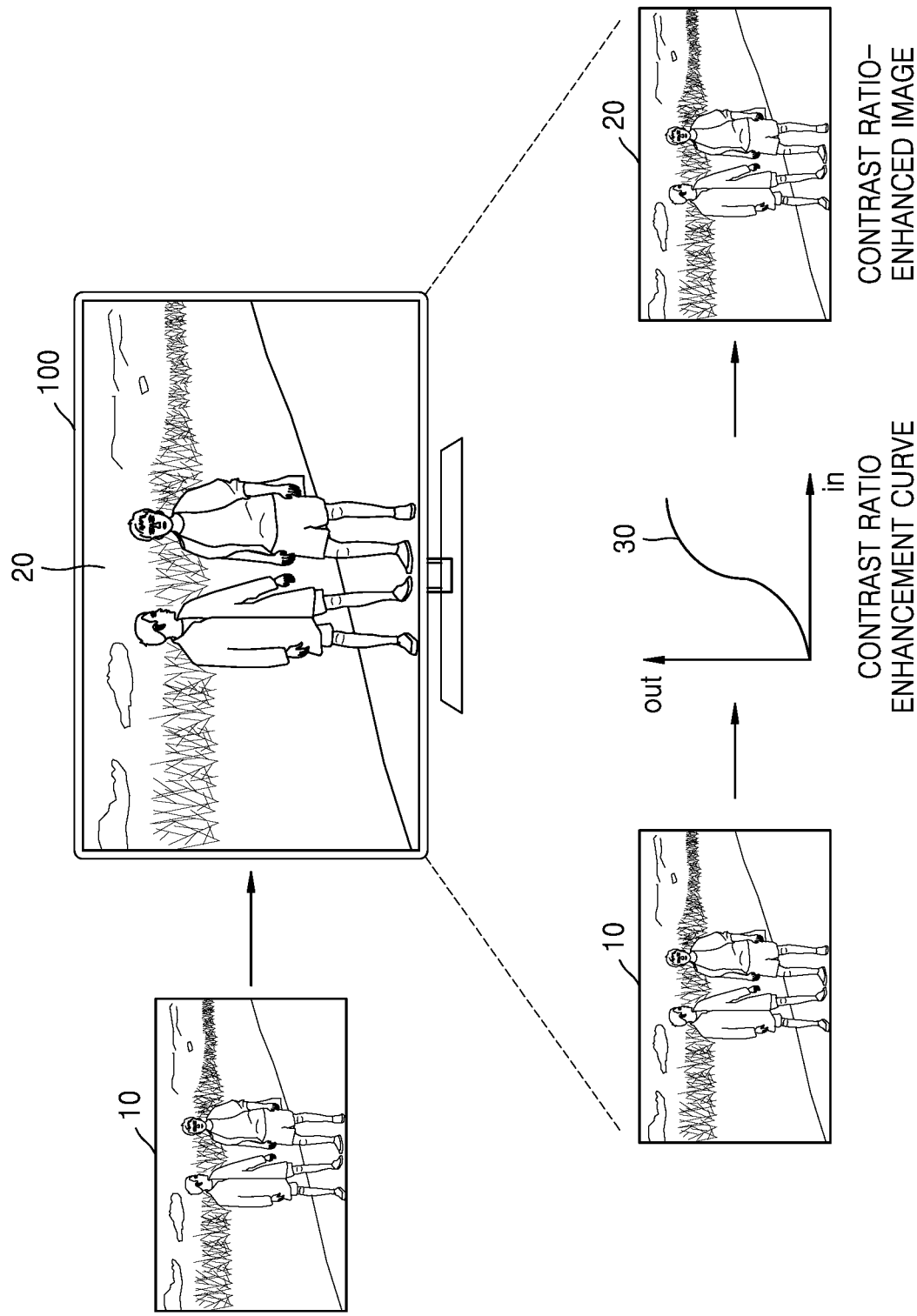
FIG. 1 illustrates a display device according to an embodiment of the disclosure.

Embodiments described in the specification and configurations illustrated in the drawings are merely preferred examples of the embodiments of the disclosure, and may be modified in various different ways at the time of filing of the present application to replace the embodiments and drawings of the specification.

Throughout the disclosure, the expression "at least one of a, b or c" indicates only a, only b, only c, both a and b, both a and c, both b and c, all of a, b, and c, or variations thereof.

The terms used in the specification will be schematically described, and then, the disclosure will be described in detail.

The terms used in the disclosure are those general terms currently widely used in the art while considering the functions of the disclosure, but the terms may vary according to the intention of those of ordinary skill in the art, precedents, or new technology in the art. Also, specified terms may be selected by the applicant, and in this case, the detailed meaning thereof will be described in the detailed description. Thus, the terms used in the disclosure should be defined not as simple names but based on the meaning of the terms and the overall description.

Throughout the specification, when a certain part "includes" a certain component, this indicates that the part may further include another component instead of excluding another component unless there is different disclosure. In addition, terms such as " . . . unit" and " . . . module" used in the specification refer to units that perform at least one function or operation, and the units may be implemented as hardware or software or as a combination of hardware and software.

Hereinafter, embodiments of the disclosure will be described in detail with reference to the accompanying drawings so that those of ordinary skill in the art to which the disclosure belongs may easily realize the disclosure. However, the disclosure may be embodied in many different forms and should not be construed as being limited to the embodiments of the disclosure set forth herein. In the drawings, parts irrelevant to the description are omitted to clearly describe the disclosure, and like reference numerals denote like elements throughout the specification.

In the embodiments of the specification, the term "user" indicates a person who controls a system, a function, or an operation and may include a developer, a manager, or an installation engineer.

In addition, in the embodiments of the specification, the term "image" or "picture" may indicate a still image, a moving picture including a plurality of consecutive still images (or frames), or a video.

Various embodiments may provide a display device capable of performing contrast ratio enhancement processing by considering all of a display characteristic of the display device, a characteristic of an entire image, a characteristic for each local region included in the image, and a characteristic for each object region included in the image, and an operating method of the display device.

A display device according to an embodiment of the disclosure may perform contrast ratio enhancement processing optimized to an image, by considering all of a characteristic of the entire image, a characteristic for each local region included in the image, and a characteristic for each object region included in the image.

In addition, a display device according to an embodiment of the disclosure may perform contrast ratio enhancement processing optimized to a display characteristic.

In addition, when a contrast ratio enhancement processing method according to an embodiment of the disclosure is applied, the same contrast ratio enhancement module may be applied to a plurality of display devices having different display characteristics, and thus, product manufacturing costs may be reduced.

FIG. 1 illustrates a display device according to an embodiment of the disclosure.

Referring to FIG. 1, the display device 100 according to an embodiment of the disclosure may be an electronic device for receiving an image and performing contrast ratio enhancement processing on the received image. For example, the display device 100 may be implemented in various forms such as a TV, a cellular phone, a tablet personal computer (PC), a digital camera, a camcorder, a laptop computer, a desktop computer, an e-book terminal, a digital broadcasting terminal, a personal digital assistant (PDA), a portable multimedia player (PMP), a navigation machine, an MP3 player, and a wearable device.

In addition, the display device 100 may include a display and display, on the display, an image on which contrast ratio enhancement processing has been performed. In addition, the display device 100 may be a stationary electronic device placed at a fixed location, a mobile electronic device having a portable shape, or a digital broadcasting receiver capable of receiving a digital broadcast signal. In particular, embodiments may be easily implemented in an image processing device with a large display like a TV but is not limited thereto.

The display device 100 according to an embodiment of the disclosure may perform contrast ratio enhancement processing on an image 10 input or received from an external device or an external server, and display a contrast ratio-enhanced image on the display. In this case, the display device 100 may obtain an output image 20 of which a contrast ratio is enhanced, by applying a contrast ratio enhancement curve 30 to the input image 10. For example, the contrast ratio enhancement curve 30 may be represented on a two-dimensional plane including an X-axis and a Y-axis, wherein the X-axis indicates an input pixel luminance value, and the Y-axis indicates an output pixel luminance value. The display device 100 may obtain the output image 20 by changing luminance values of pixels included in the input image 10 according to the contrast ratio enhancement curve 30.

The display device 100 according to an embodiment of the disclosure may obtain the output image 20 of which a contrast ration is enhanced, by applying, to the input image 10, a global contrast ratio enhancement curve based on a global (overall) characteristic of the input image 10, a local contrast ratio enhancement curve based on a characteristic for each region, and an object contrast ratio enhancement curve based on a characteristic for each object unit region.

The display device 100 according to an embodiment of the disclosure may determine the global contrast ratio enhancement curve based on feature information extracted from the entire region of the input image 10. Particularly, the display device 100 may generate the global contrast ratio enhancement curve corresponding to the input image 10 based on the feature information extracted from the entire region of the input image 10 and a curve generation network.

In addition, the display device 100 according to an embodiment of the disclosure may determine the local contrast ratio enhancement curve based on feature information extracted from each of a plurality of regions included in the input image 10. Particularly, the display device 100 may generate the local contrast ratio enhancement curve corresponding to each of the plurality of regions based on the feature information extracted from each of the plurality of regions included in the input image 10 and the curve generation network.

In addition, the display device 100 according to an embodiment of the disclosure may determine the object contrast ratio enhancement curve based on feature information extracted from each of a plurality of object regions included in the input image 10. Particularly, the display device 100 may generate the object contrast ratio enhancement curve corresponding to each of the plurality of object regions based on the feature information extracted from each of the plurality of object regions included in the input image 10 and the curve generation network.

Feature information according to an embodiment of the disclosure may be extracted based on at least one of luminance information, RGB information, frequency information, or noise information of pixels included in the entire image, each of the plurality of regions, or each of the plurality of object regions.

In addition, parameter information set in the curve generation network may be determined by training the curve generation network based on training data obtained using a contrast ratio enhancement algorithm according to a display characteristic of the display device 100. Herein, the training data may include feature information extracted from a plurality of training images, and contrast ratio enhancement curve information obtained by applying the contrast ratio enhancement algorithm to the plurality of training images.

The display device 100 according to an embodiment of the disclosure may generate the output image 20 by sequentially applying the global contrast ratio enhancement curve, the local contrast ratio enhancement curve, and the object contrast ratio enhancement curve to the first image 10. Alternatively, the display device 100 may generate a synthesized contrast ratio enhancement curve based on the global contrast ratio enhancement curve, the local contrast ratio enhancement curve, and the object contrast ratio enhancement curve and generate the output image 20 by applying the synthesized contrast ratio enhancement curve to the first image 10.

Hereinafter, the disclosure is described in detail with reference to the drawings.

Figure 2:
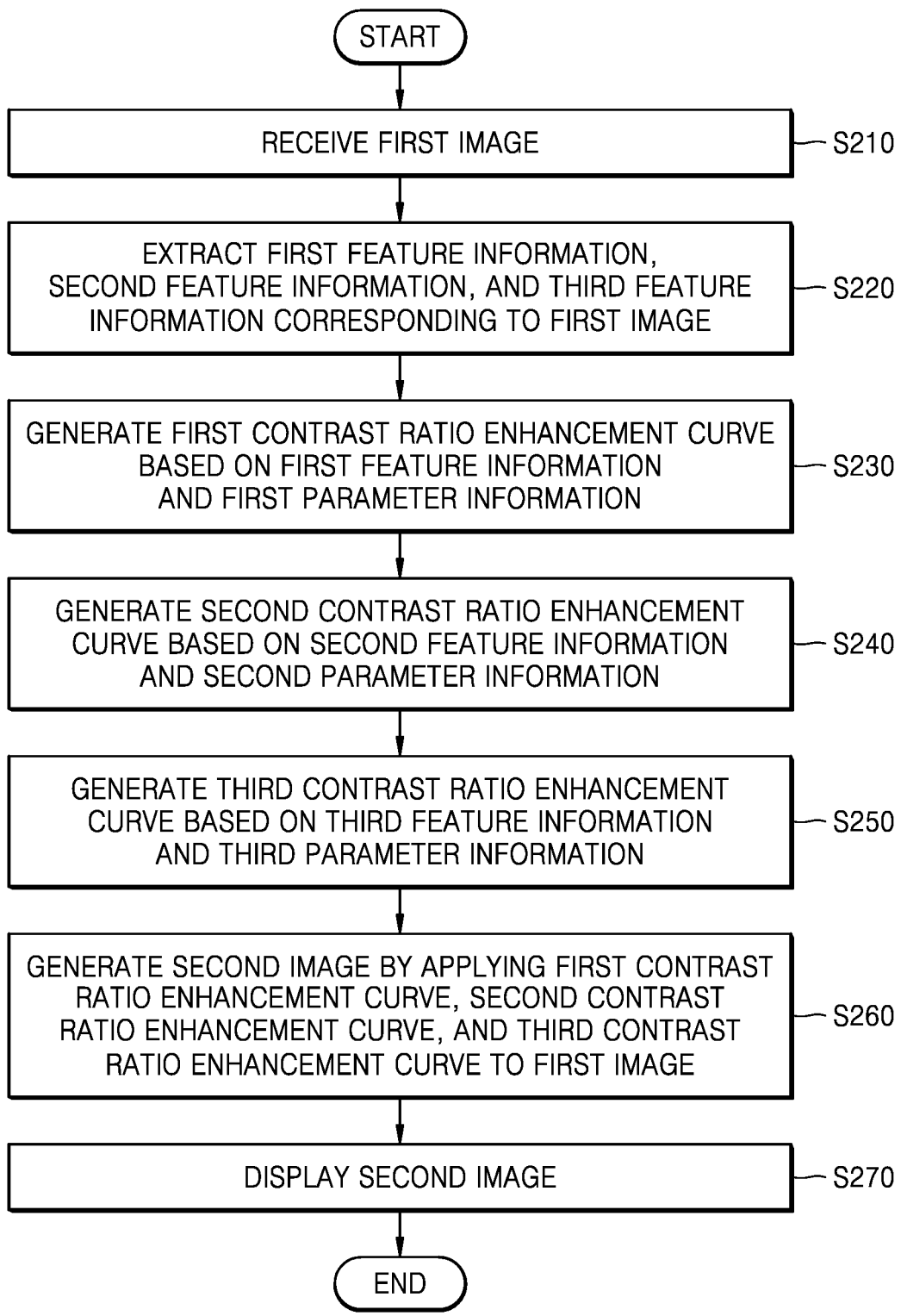
FIG. 2 is a flowchart of an operating method of a display device, according to an embodiment of the disclosure.

FIG. 2 is a flowchart of an operating method of a display device, according to an embodiment of the disclosure.

Referring to FIG. 2, the display device 100 according to an embodiment of the disclosure may receive a first image in operation S210. For example, the display device 100 may receive the first image from an external device or an external server or receive the first image as an input.

The display device 100 according to an embodiment of the disclosure may extract first feature information, second feature information, and third feature information corresponding to the received first image in operation S220.

For example, the first feature information may indicate a characteristic of the entire region of the first image, and the second feature information may indicate a characteristic of each of a plurality of regions included in the first image. In addition, the third feature information may indicate a characteristic of each of a plurality of object regions included in the first image. Herein, the characteristic of the entire region or a partial region of the first image may include histograms, average values, median values, minimum/maximum values, and the like indicating luminance information, RGB information, frequency information, and noise information of pixels included in the entire region or the partial region of the first image but is not limited thereto.

The display device 100 according to an embodiment of the disclosure may generate a first contrast ratio enhancement curve (global contrast ratio enhancement curve) based on the first feature information and first parameter information in operation S230.

For example, the display device 100 may receive the first parameter information from the external device, and the first parameter information may include preset values. The display device 100 may obtain first contrast ratio enhancement curve information (the first contrast ratio enhancement curve or points included in the first contrast ratio enhancement curve) as an output by setting, as the first parameter information, parameters (weights or coefficients) of nodes included in a curve generation network and inputting the first feature information to the curve generation network in which the first parameter information is set. Herein, the first parameter information may include values determined by training the curve generation network with first training data. This will be described in detail below with reference to FIG. 11.

The display device 100 may generate the first contrast ratio enhancement curve based on the first contrast ratio enhancement curve information. For example, the display device 100 may generate the first contrast ratio enhancement curve by interpolating points included in the first contrast ratio enhancement curve. However, the present embodiment is not limited thereto.

In addition, the display device 100 may generate a second contrast ratio enhancement curve (local contrast ratio enhancement curve) based on the second feature information and second parameter information in operation S240.

For example, the display device 100 may receive the second parameter information from the external device, and the second parameter information may include preset values. The display device 100 may obtain second contrast ratio enhancement curve information (the second contrast ratio enhancement curve or points included in the second contrast ratio enhancement curve) as an output by setting, as the second parameter information, parameters (weights or coefficients) of nodes included in the curve generation network and inputting the second feature information to the curve generation network in which the second parameter information is set. Herein, the second parameter information may include values determined by training the curve generation network with second training data, and this will be described in detail below with reference to FIG. 11.

The display device 100 may generate the second contrast ratio enhancement curve based on the second contrast ratio enhancement curve information.

In addition, the display device 100 may generate a third contrast ratio enhancement curve (object contrast ratio enhancement curve) based on the third feature information and third parameter information in operation S250.

For example, the display device 100 may receive the third parameter information from the external device, and the third parameter information may include preset values. The display device 100 may obtain third contrast ratio enhancement curve information (the third contrast ratio enhancement curve or points included in the third contrast ratio enhancement curve) as an output by setting, as the third parameter information, parameters (weights or coefficients) of nodes included in the curve generation network and inputting the third feature information to the curve generation network in which the third parameter information is set.

Herein, the third parameter information may include values determined by training the curve generation network with third training data, and this will be described in detail below with reference to FIG. 11.

The display device 100 may generate the third contrast ratio enhancement curve based on the third contrast ratio enhancement curve information.

In operation S260, the display device 100 according to an embodiment of the disclosure may generate a second image by applying, to the first image, the first contrast ratio enhancement curve generated in operation S230, the second contrast ratio enhancement curve generated in operation S240, and the third contrast ratio enhancement curve generated in operation S250.

For example, the display device 100 may generate the second image by sequentially applying the first contrast ratio enhancement curve, the second contrast ratio enhancement curve, and the third contrast ratio enhancement curve to the first image. This will be described in detail below with reference to FIG. 8.

Alternatively, the display device 100 may generate a fourth contrast ratio enhancement curve based on the first contrast ratio enhancement curve, the second contrast ratio enhancement curve, and the third contrast ratio enhancement curve. Herein, the fourth contrast ratio enhancement curve may be a weighted sum of the first contrast ratio enhancement curve, the second contrast ratio enhancement curve, and the third contrast ratio enhancement curve but is not limited thereto. In addition, the fourth contrast ratio enhancement curve may be generated for each region or each pixel included in the first image but is not limited thereto. The display device 100 may generate the second image by applying the fourth contrast ratio enhancement curve to the first image. This will be described in detail below with reference to FIG. 9.

In operation S270, the display device 100 may display the second image to which the first contrast ratio enhancement curve, the second contrast ratio enhancement curve, and the third contrast ratio enhancement curve are applied.

Figure 3:
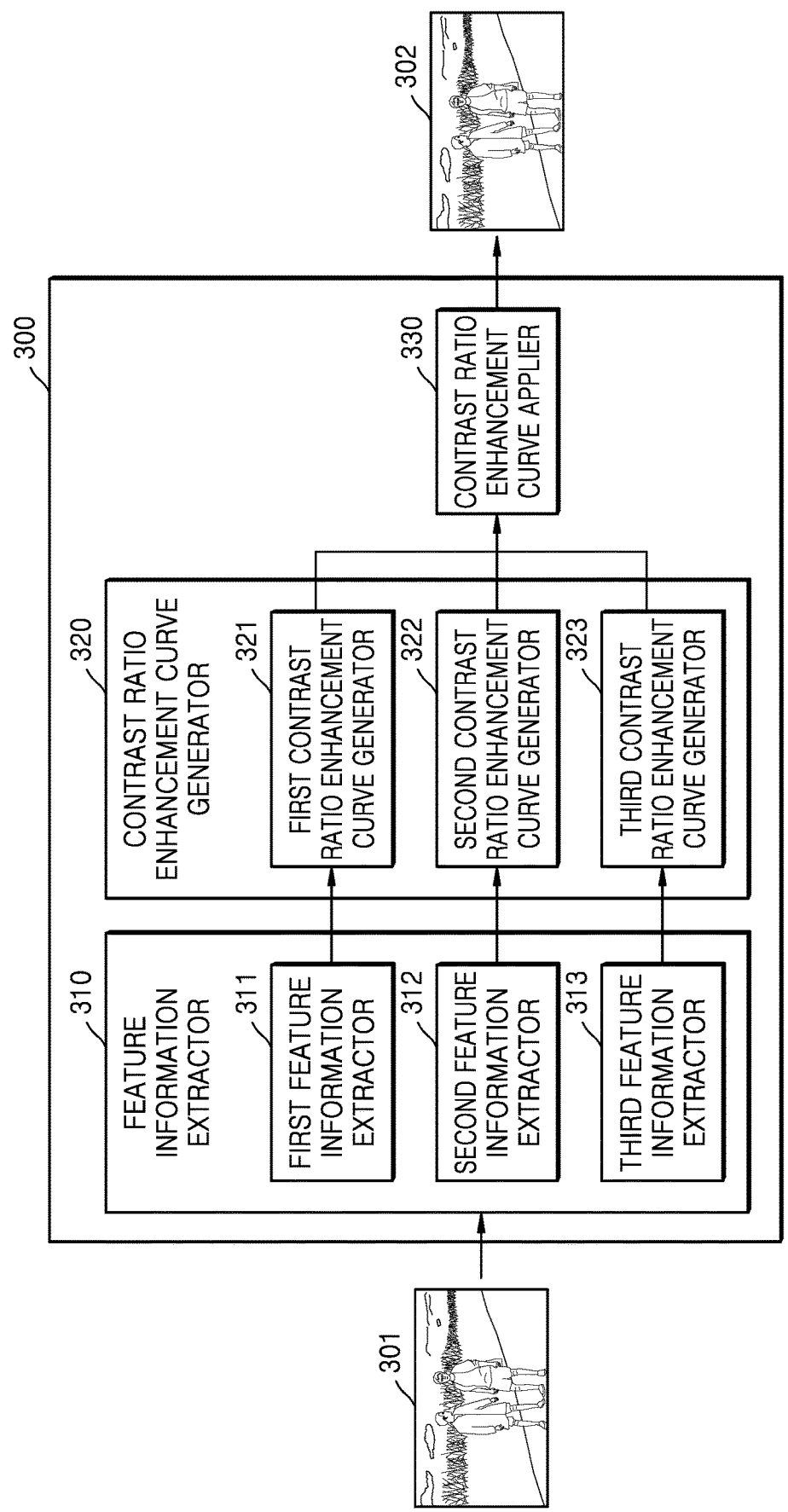
FIG. 3 is a block diagram of a device (or module) configured to perform contrast ratio enhancement processing, according to an embodiment of the disclosure.

FIG. 3 is a block diagram of a device (or module) configured to perform contrast ratio enhancement processing, according to an embodiment of the disclosure.

Figure 13:
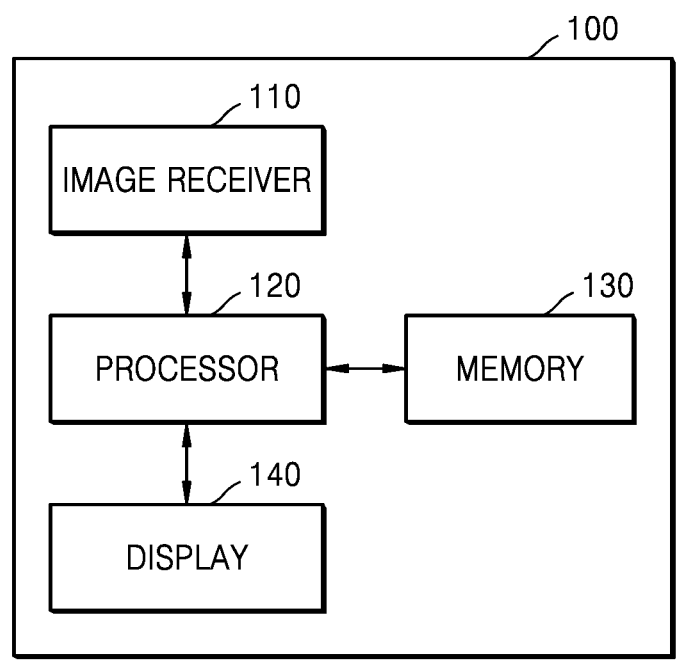
FIG. 13 is a block diagram of a display device according to an embodiment of the disclosure.
Figure 14:
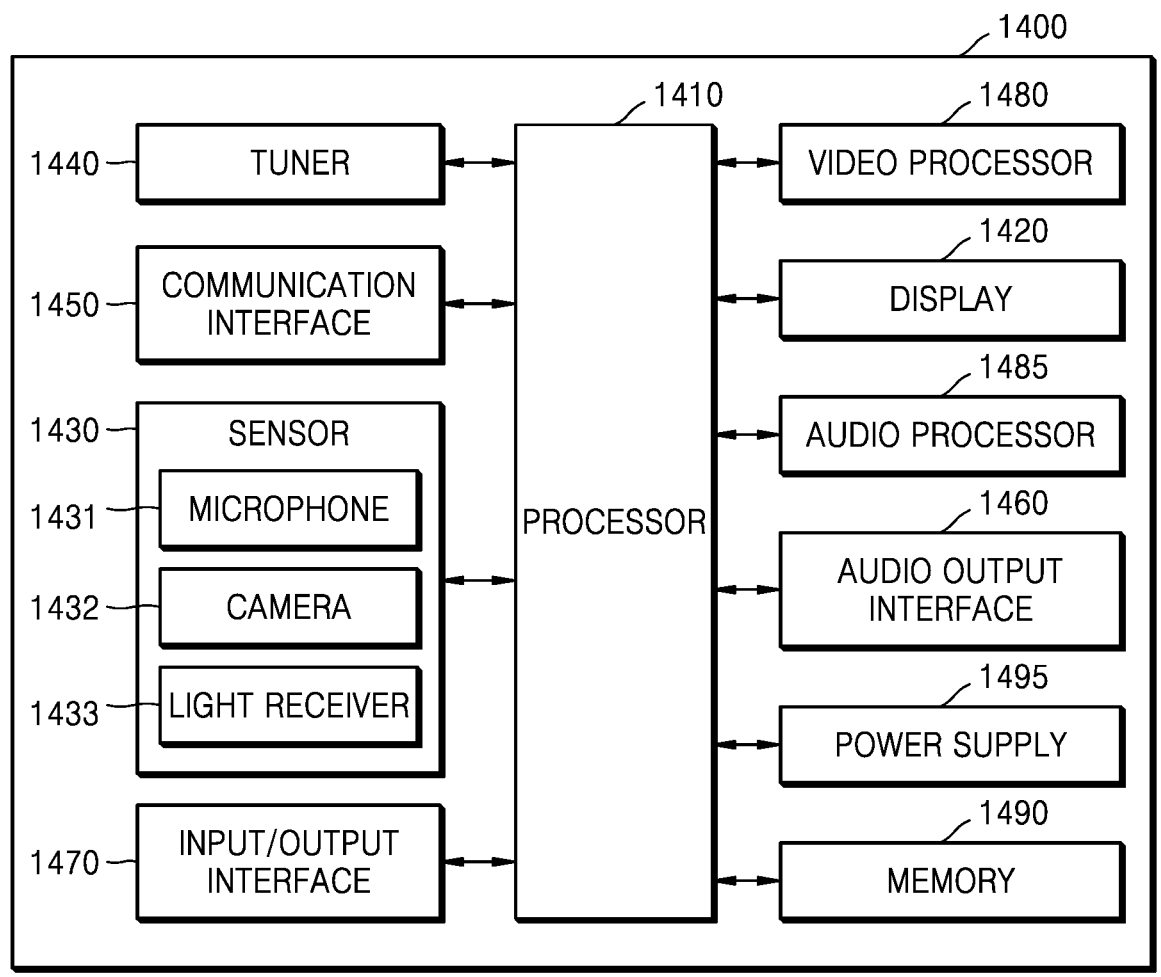
FIG. 14 is a block diagram of a display device according to another embodiment of the disclosure.

The device (or module) 300 configured to perform contrast ratio enhancement processing, according to an embodiment of the disclosure, may be included in a portion of the display device 100 shown in FIG. 1, a portion of the display device 100 shown in FIG. 13, or a portion of a display device 1400 shown in FIG. 14.

Referring to FIG. 3, the device (or module) 300 configured to perform contrast ratio enhancement processing, according to an embodiment of the disclosure, may include a feature information extractor 310, a contrast ratio enhancement curve generator 320, and a contrast ratio enhancement curve applier 330.

The feature information extractor 310 may include a first feature information extractor 311, a second feature information extractor 312, and a third feature information extractor 313. Herein, the first feature information extractor 311, the second feature information extractor 312, and the third feature information extractor 313 may include a logic, a circuit, an interface, and/or a code appropriately operating to extract feature information of the entire region or a partial region of an image.

The first feature information extractor 311 may extract a characteristic (first feature information) of the entire region of a first image 301 based on at least one of luminance information, RGB information, frequency information, or noise information of pixels included in the entire region of the first image 301. For example, the first feature information extractor 311 may extract, as the characteristic (the first feature information) of the entire region of the first image 301, a histogram, an average value, a median value, a minimum or maximum value, and the like of at least one of the luminance information, the RGB information, the frequency information, or the noise information of the pixels included in the entire region of the first image 301 but is not limited thereto. This will be described in detail below with reference to FIG. 5.

In addition, the second feature information extractor 312 may extract, as a characteristic (second feature information) of each of a plurality of regions included in the first image 301, a histogram, an average value, a minimum or maximum value, and the like of at least one of luminance information, RGB information, frequency information, or noise information of pixels included in each of the plurality of regions. However, the present embodiment is not limited thereto.

In addition, the third feature information extractor 313 may extract, as a characteristic (third feature information) of each of a plurality of object regions included in the first image 301, a histogram, an average value, a minimum or maximum value, and the like of at least one of luminance information, RGB information, frequency information, or noise information of pixels included in each of the plurality of object regions.

Referring to FIG. 3, the contrast ratio enhancement curve generator 320 may include a first contrast ratio enhancement curve generator 321, a second contrast ratio enhancement curve generator 322, and a third contrast ratio enhancement curve generator 323. Herein, the first contrast ratio enhancement curve generator 321, the second contrast ratio enhancement curve generator 322, and the third contrast ratio enhancement curve generator 323 may include a logic, a circuit, an interface, and/or a code appropriately operating to generate a contrast ratio enhancement curve.

The first contrast ratio enhancement curve generator 321 may generate a first contrast ratio enhancement curve based on the first feature information extracted by the first feature information extractor 311 and a curve generation network. For example, the first contrast ratio enhancement curve generator 321 may receive the first feature information from the first feature information extractor 311. In addition, the first contrast ratio enhancement curve generator 321 may set, as first parameter information, parameters (weights or coefficients) included in the curve generation network. Herein, the first parameter information may be received from an external device or a server.

The first contrast ratio enhancement curve generator 321 may obtain first contrast ratio enhancement curve information (the first contrast ratio enhancement curve or points included in the first contrast ratio enhancement curve) as an output by inputting the first feature information to the curve generation network in which the first parameter information is set. The first contrast ratio enhancement curve generator 321 may generate the first contrast ratio enhancement curve based on the first contrast ratio enhancement curve information. For example, the first contrast ratio enhancement curve generator 321 may generate the first contrast ratio enhancement curve by interpolating the points included in the first contrast ratio enhancement curve, which are output from the curve generation network.

In addition, the second contrast ratio enhancement curve generator 322 may generate a second contrast ratio enhancement curve based on the second feature information extracted by the second feature information extractor 312 and the curve generation network. For example, the second contrast ratio enhancement curve generator 322 may set, as second parameter information, parameters (weights or coefficients) included in the curve generation network. Herein, the second parameter information may be received from the external device or the server. The second contrast ratio enhancement curve generator 322 may obtain second contrast ratio enhancement curve information (the second contrast ratio enhancement curve or points included in the second contrast ratio enhancement curve) as an output by inputting the second feature information to the curve generation network in which the second parameter information is set. The second contrast ratio enhancement curve generator 322 may generate the second contrast ratio enhancement curve based on the second contrast ratio enhancement curve information.

In addition, the third contrast ratio enhancement curve generator 323 may generate a third contrast ratio enhancement curve based on the third feature information extracted by the third feature information extractor 313 and the curve generation network. For example, the third contrast ratio enhancement curve generator 323 may set, as third parameter information, parameters (weights or coefficients) included in the curve generation network. Herein, the third parameter information may be received from the external device or the server. The third contrast ratio enhancement curve generator 323 may obtain third contrast ratio enhancement curve information (the third contrast ratio enhancement curve or points included in the third contrast ratio enhancement curve) as an output by inputting the third feature information to the curve generation network in which the third parameter information is set. The third contrast ratio enhancement curve generator 323 may generate the third contrast ratio enhancement curve based on the third contrast ratio enhancement curve information.

Referring to FIG. 3, the contrast ratio enhancement curve applier 330 may generate a second image 302 by applying, to the first image 301, the first contrast ratio enhancement curve, the second contrast ratio enhancement curve, and the third contrast ratio enhancement curve, which are generated by the contrast ratio enhancement curve generator 320.

For example, the contrast ratio enhancement curve applier 330 may generate the second image 302 by sequentially applying the first contrast ratio enhancement curve, the second contrast ratio enhancement curve, and the third contrast ratio enhancement curve to the first image 301. This will be described in detail below with reference to FIG. 8.

Alternatively, the contrast ratio enhancement curve applier 330 may generate a fourth contrast ratio enhancement curve based on the first contrast ratio enhancement curve, the second contrast ratio enhancement curve, and the third contrast ratio enhancement curve and generate the second image 302 by applying the fourth contrast ratio enhancement curve to the first image 301. This will be described in detail below with reference to FIG. 9.

Figure 4:
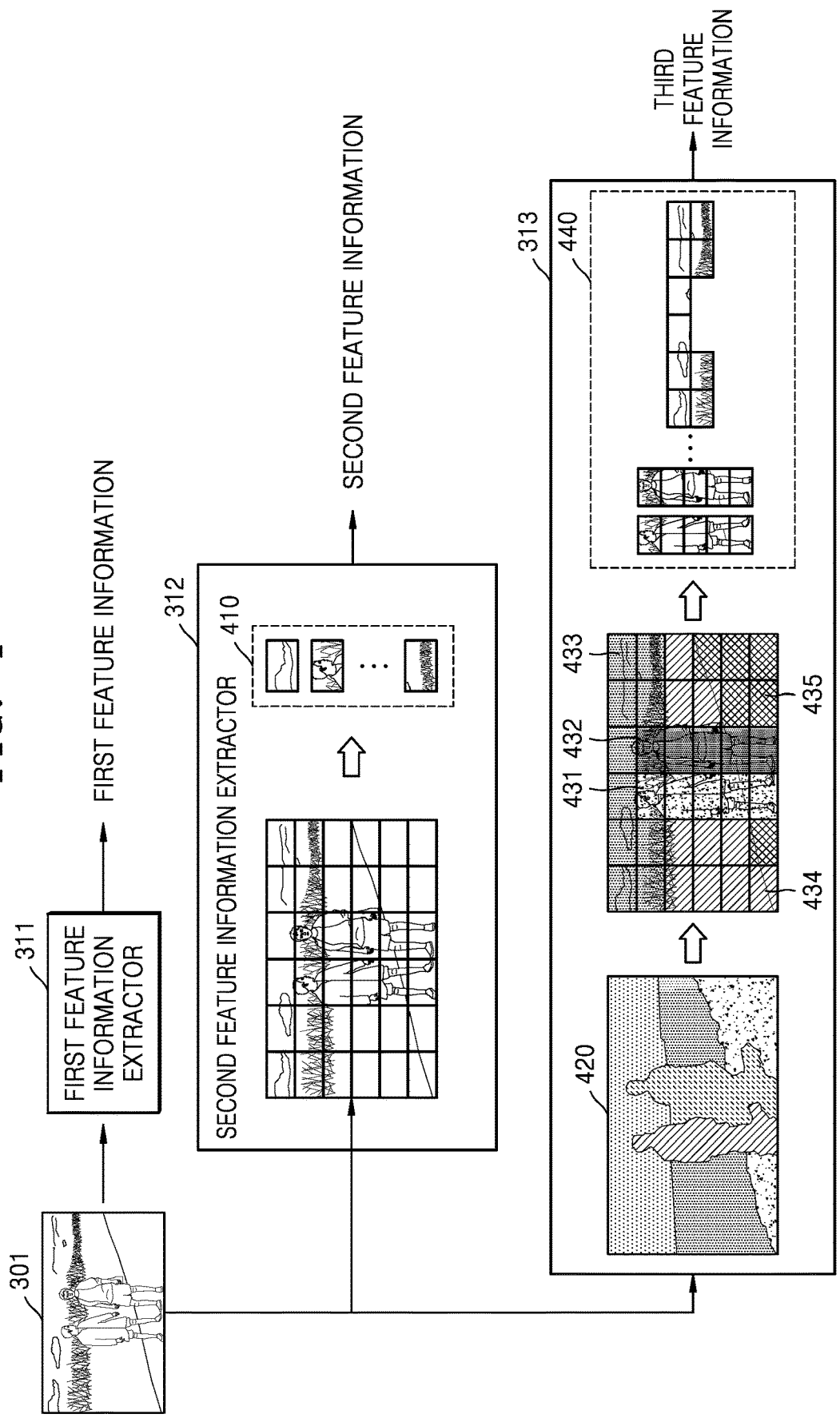

FIGS. 4 and 5 are referred to describe a method, performed by a feature information extractor, of extracting feature information, according to an embodiment of the disclosure.

Referring to FIG. 4, the first feature information extractor 311 may receive the first image 301 as an input and extract a characteristic of the entire region of the first image 301 as first feature information. A method of extracting the first feature information is described with reference to FIG. 5.

Referring to FIG. 5, the first feature information extractor 311 may extract the first feature information based on at least one of luminance information, RGB information, frequency information, or noise information of pixels included in the first image 301. For example, the first feature information extractor 311 may generate a luminance histogram 510 of luminance values (the luminance information) of the pixels included in the first image 301. The first feature information extractor 311 may extract the generated luminance histogram 510 as the first feature information. Alternatively, the first feature information extractor 311 may extract a maximum luminance value and a minimum luminance value as the first feature information based on the generated luminance histogram 510. Alternatively, the first feature information extractor 311 may extract an average luminance value or a median luminance value as the first feature information based on the generated luminance histogram 510.

In addition, the first feature information extractor 311 may generate an RGB histogram 520 of each of RGB values (the RGB information) of the pixels included in the first image 301 and extract the RGB histogram 520 as the first feature information. Alternatively, the first feature information extractor 311 may extract an maximum RGB value or a minimum RGB value as the first feature information based on the RGB histogram 520. Alternatively, the first feature information extractor 311 may extract an average RGB value or a median RGB value as the first feature information based on the generated RGB histogram 520.

In addition, the first feature information extractor 311 may generate a frequency histogram 530 of the frequency information of the pixels included in the first image 301 and extract the frequency histogram 530 as the first feature information. Alternatively, the first feature information extractor 311 may extract an average frequency value or a median frequency value as the first feature information based on the frequency histogram 530.

In addition, the first feature information extractor 311 may generate a noise histogram 540 of the noise information of the pixels included in the first image 301 and extract the noise histogram 540 as the first feature information. Alternatively, the first feature information extractor 311 may extract an average noise value or a median noise value as the first feature information based on the noise histogram 540.

Referring back to FIG. 4, the first image 301 may be divided into N×M regions having the same size. Although FIG. 4 shows for convenience of description that the first image 301 is divided into 6×6 regions, the present embodiment is not limited thereto.

When the first image 301 is divided into 6×6 regions, the second feature information extractor 312 may extract second feature information of each of 36 regions 410. The second feature information extractor 312 may extract the second feature information based on at least one of luminance information, RGB information, frequency information, or noise information of pixels included in each of the 36 regions 410. A method of extracting feature information based on at least one of luminance information, RGB information, frequency information, or noise information has been described with reference to FIG. 5, and thus, a detailed description thereof is omitted herein.

Accordingly, the second feature information extractor 312 may extract 36 pieces of the second feature information.

In addition, the third feature information extractor 313 according to an embodiment of the disclosure may extract objects from the first image 301. For example, the third feature information extractor 313 may extract the objects included in the first image 301 by using an object extraction network but is not limited thereto. In addition, although FIG. 4 shows that the third feature information extractor 313 extracts the objects from the first image 301, the present embodiment is not limited thereto, and the objects may be extracted from the first image 301 by a separate component.

The third feature information extractor 313 may perform clustering based on the extracted objects. A clustered image 420 may be divided into a plurality of object regions based on a plurality of regions. Herein, the plurality of regions may be the 6×6 regions equally divided from the first image 301, and the plurality of object regions may be divided based on region units.

Accordingly, as shown in FIG. 4, the first image 301 may be divided into a first object region 431 including a first object (e.g., "person 1"), a second object region 432 including a second object (e.g., "person 2"), a third object region 433 including a third object (e.g., "sky"), a fourth object region 434 including a fourth object (e.g., "water"), and a fifth object region 435 including a fifth object (e.g., "earth").

A method of dividing object regions, which is shown in FIG. 4 and has been described with reference to FIG. 4, is merely illustrative, and the third feature information extractor 313 according to an embodiment of the disclosure may divide object regions by using various methods.

The third feature information extractor 313 may extract third feature information based on at least one of luminance information, RGB information, frequency information, or noise information of pixels included in each of a plurality of object regions 440. A method of extracting feature information based on at least one of luminance information, RGB information, frequency information, or noise information has been described with reference to FIG. 5, and thus, a detailed description thereof is omitted herein.

Accordingly, the third feature information extractor 313 may extract five pieces of the third feature information.

Figure 7:
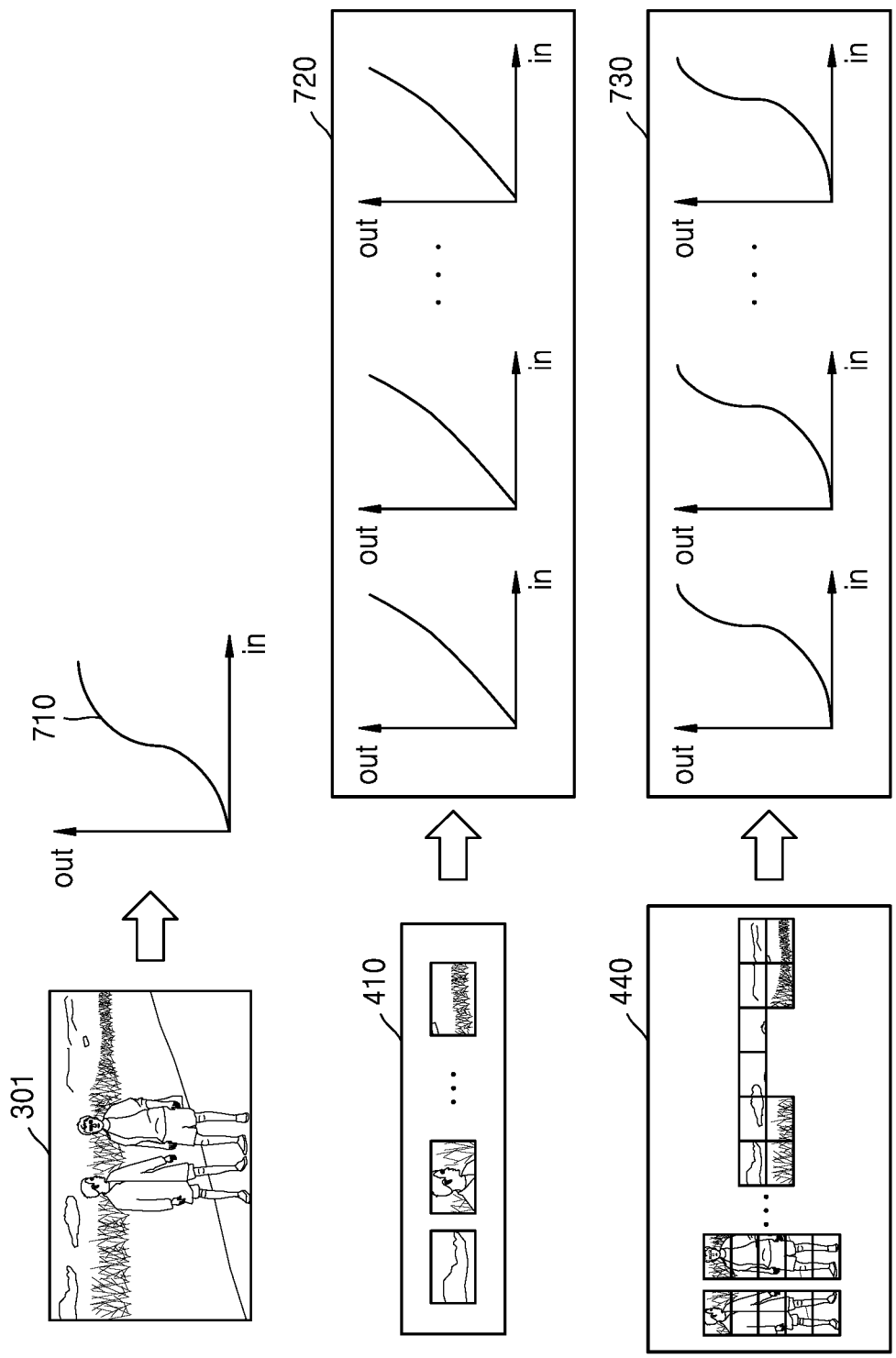

FIGS. 6 and 7 are referred to describe a method of generating a contrast ratio enhancement curve, according to an embodiment of the disclosure.

Referring to FIG. 6, the display device 100 according to an embodiment of the disclosure may receive, from an external device, first parameter information corresponding to first feature information (feature information of the entire image), second parameter information corresponding to second feature information (feature information for each region), and third parameter information corresponding to third feature information (feature information for each object region).

Herein, the external device may train a curve generation network by using a plurality of training data sets generated based on a plurality of training images and a plurality of contrast ratio enhancement algorithms, thereby determining a plurality of pieces of parameter information.

The first parameter information, the second parameter information, and the third parameter information according to an embodiment of the disclosure may be parameter information trained based on a contrast ratio enhancement algorithm optimized to a display characteristic of a display included in the display device 100. For example, when the contrast ratio enhancement algorithm optimized to the display characteristic of the display device 100 is a first contrast ratio enhancement algorithm, the first parameter information, the second parameter information, and the third parameter information may be obtained by training the curve generation network with training data obtained using the first contrast ratio enhancement algorithm. This will be described in detail below with reference to FIG. 11.

The contrast ratio enhancement curve generator 320 according to an embodiment of the disclosure may generate a contrast ratio enhancement curve by using a curve generation network 610. The curve generation network 610 according to an embodiment of the disclosure may include a structure configured to receive feature information as an input and output contrast ratio enhancement curve information.

The first contrast ratio enhancement curve generator 321 according to an embodiment of the disclosure may obtain first contrast ratio enhancement curve information (a first contrast ratio enhancement curve or points included in the first contrast ratio enhancement curve) as an output by setting, as the first parameter information, parameters (weights or coefficients) included in the curve generation network 610 and inputting the first feature information to the curve generation network 610 in which the first parameter information is set. The first contrast ratio enhancement curve generator 321 may generate the first contrast ratio enhancement curve based on the first contrast ratio enhancement curve information. For example, when the points included in the first contrast ratio enhancement curve are output, the first contrast ratio enhancement curve generator 321 may generate the first contrast ratio enhancement curve by interpolating the points. However, the present embodiment is not limited thereto.

As shown in FIG. 7, a first contrast ratio enhancement curve 710 may be a global contrast ratio enhancement curve applied to the entire region of the first image 301.

In addition, the second contrast ratio enhancement curve generator 322 may obtain second contrast ratio enhancement curve information (a second contrast ratio enhancement curve or points included in the second contrast ratio enhancement curve) as an output by setting, as the second parameter information, parameters (weights or coefficients) included in the curve generation network 610 and inputting the second feature information to the curve generation network 610 in which the second parameter information is set. The second contrast ratio enhancement curve generator 322 may generate the second contrast ratio enhancement curve based on the second contrast ratio enhancement curve information.

As shown in FIG. 7, second contrast ratio enhancement curves 720 may be local contrast ratio enhancement curves respectively applied to regions included in the first image 301, and the number of generated second contrast ratio enhancement curves 720 is the same as the number of regions 410 included in the first image 301. For example, when the first image 301 is divided into 6×6 regions, the number of second contrast ratio enhancement curves 720 is 36, and the second contrast ratio enhancement curves 720 may be respectively applied to corresponding regions.

In addition, the third contrast ratio enhancement curve generator 323 may obtain third contrast ratio enhancement curve information (a third contrast ratio enhancement curve or points included in the third contrast ratio enhancement curve) as an output by setting, as the third parameter information, parameters (weights or coefficients) included in the curve generation network 610 and inputting the third feature information to the curve generation network 610 in which the third parameter information is set. The third contrast ratio enhancement curve generator 323 may generate the third contrast ratio enhancement curve based on the third contrast ratio enhancement curve information.

As shown in FIG. 7, third contrast ratio enhancement curves 730 may be object contrast ratio enhancement curves respectively applied to object regions included in the first image 301, and the number of generated third contrast ratio enhancement curves 730 is the same as the number of the plurality of object regions 440 included in the first image 301. For example, when the first image 301 is divided into five object regions, the number of third contrast ratio enhancement curves 730 is 5, and the third contrast ratio enhancement curves 730 may be respectively applied to corresponding regions.

Figure 8:
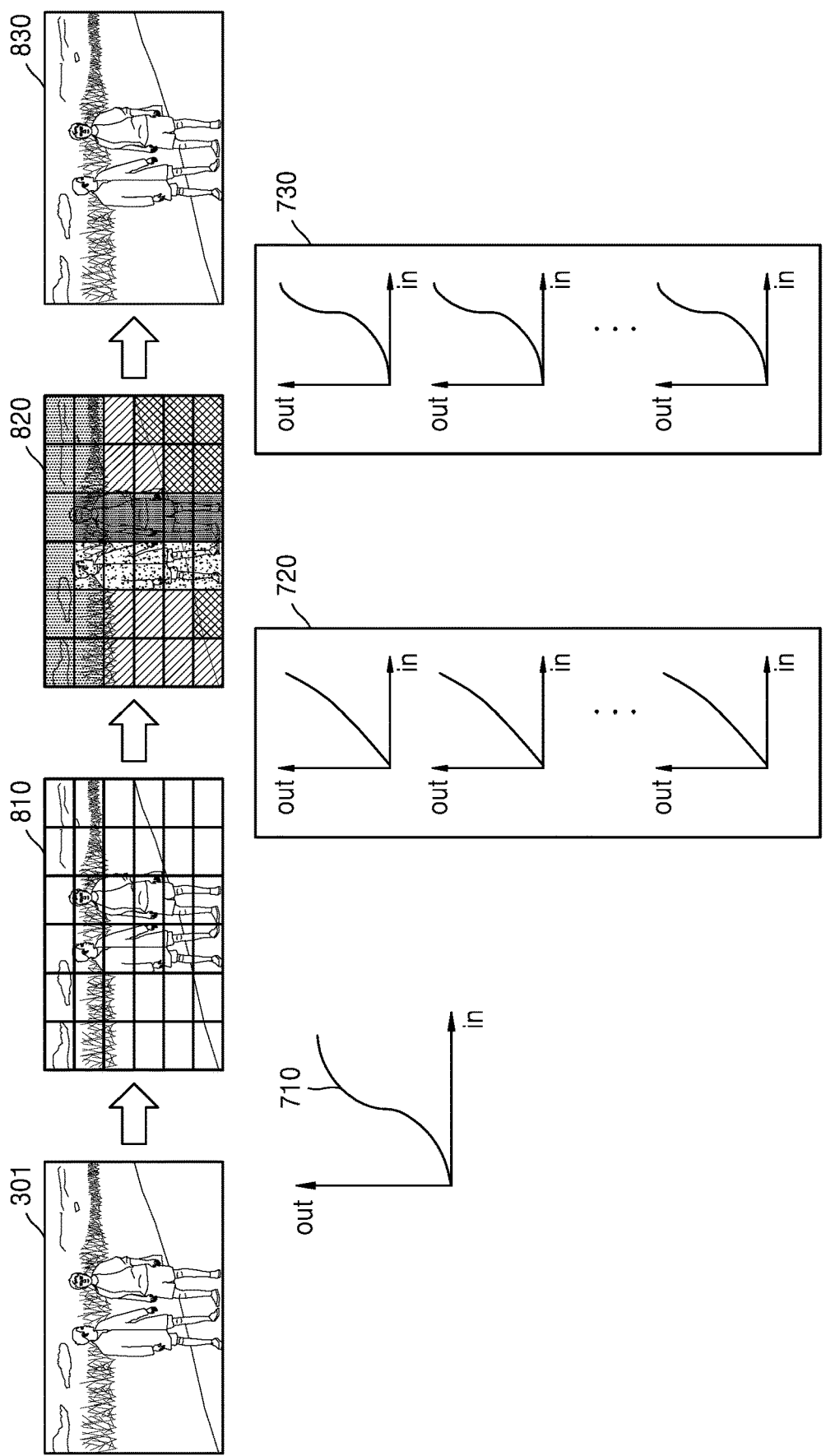
FIG. 8 is referenced to describe a method of applying a contrast ratio enhancement curve, according to an embodiment of the disclosure.

FIG. 8 is referred to describe a method of applying a contrast ratio enhancement curve, according to an embodiment of the disclosure.

Referring to FIG. 8, the contrast ratio enhancement curve applier 330 according to an embodiment of the disclosure may sequentially apply a first contrast ratio enhancement curve, a second contrast ratio enhancement curve, and a third contrast ratio enhancement curve to the first image 301.

For example, the contrast ratio enhancement curve applier 330 may generate a third image 810 by applying the first contrast ratio enhancement curve 710 to the entire region of the first image 301.

In addition, the contrast ratio enhancement curve applier 330 may generate a fourth image 820 by applying the second contrast ratio enhancement curves 720 to respective regions of the third image 810. For example, when the first image 301 is divided into 6×6 regions, the third image 810 includes the same 36 regions as the first image 301, and the second contrast ratio enhancement curves 720 respectively corresponding to the 36 regions may be generated. Accordingly, the contrast ratio enhancement curve applier 330 may generate the fourth image 820 by respectively applying the second contrast ratio enhancement curves 720 to the 36 regions.

In addition, the contrast ratio enhancement curve applier 330 may generate a second image 830 by applying, to the fourth image 820, the third contrast ratio enhancement curves 730 generated for respective object regions. When the first image 301 is divided into five object regions, the fourth image 820 includes the same five object regions as the first image 301, and the third contrast ratio enhancement curves 730 respectively corresponding to the five object regions may be generated. Accordingly, the contrast ratio enhancement curve applier 330 may generate the second image 830 by respectively applying the third contrast ratio enhancement curves 730 to the five object regions.

Figure 9:
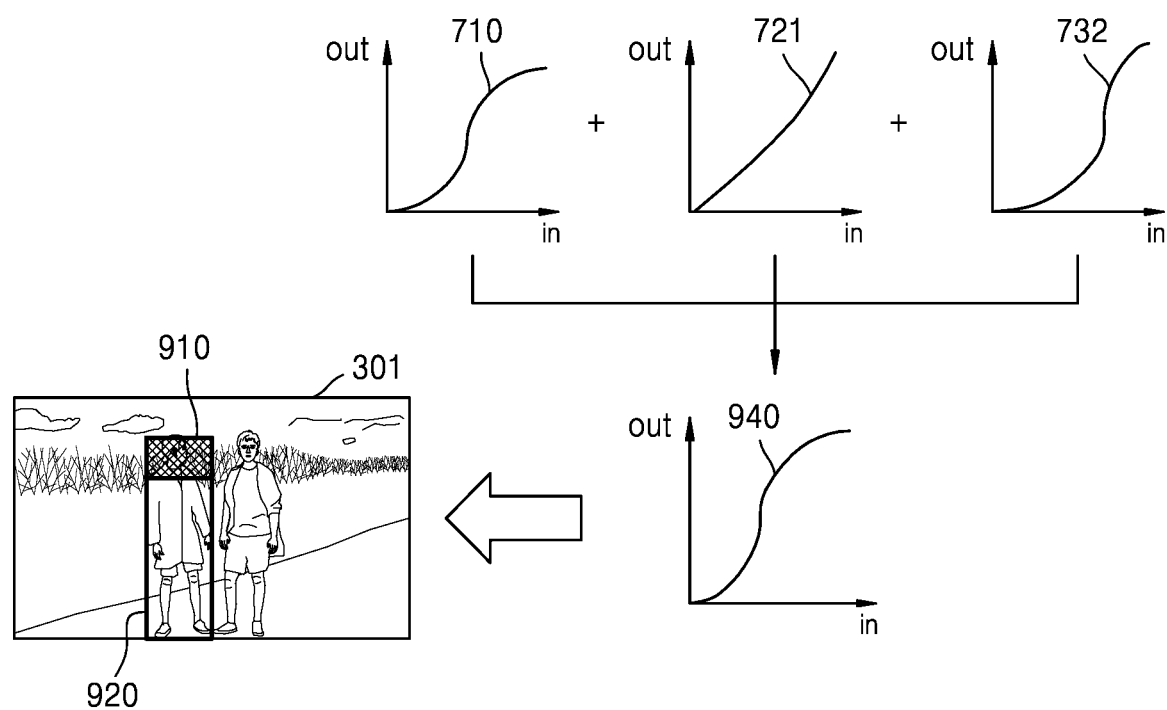
FIG. 9 is referenced to describe a method of applying a contrast ratio enhancement curve, according to an embodiment of the disclosure.

FIG. 9 is referred to describe a method of applying a contrast ratio enhancement curve, according to an embodiment of the disclosure.

Referring to FIG. 9, the contrast ratio enhancement curve applier 330 according to an embodiment of the disclosure may generate a final contrast ratio enhancement curve (a fourth contrast ratio enhancement curve) for each region or each pixel based on a first contrast ratio enhancement curve, a second contrast ratio enhancement curve, and a third contrast ratio enhancement curve. Herein, a region indicates one divided region when a first image is divided into a plurality of regions to extract second feature information according to an embodiment of the disclosure.

For example, when object regions included in the first image 301 according to an embodiment of the disclosure are divided in a region unit, a fourth contrast ratio enhancement curve may be generated for each region. Otherwise, when the object regions included in the first image 301 are divided in a pixel unit regardless of region, a fourth contrast ratio enhancement curve may be generated for each pixel. However, the present embodiment is not limited thereto.

When a fourth contrast ratio enhancement curve is generated for each region, a first region 910 among a plurality of regions included in the first image 301 may be included in a second object region 920. The contrast ratio enhancement curve applier 330 may generate a fourth contrast ratio enhancement curve 940 by applying, to the first region 910, the first contrast ratio enhancement curve 710, a second contrast ratio enhancement curve 721 corresponding to the first region 910, and a third contrast ratio enhancement curve 732 corresponding to the second object region 920. In this case, the contrast ratio enhancement curve applier 330 may determine, as the fourth contrast ratio enhancement curve 940, a weighted average value of the first contrast ratio enhancement curve 710, the second contrast ratio enhancement curve 721 corresponding to the first region 910, and the third contrast ratio enhancement curve 732 corresponding to the second object region 920 but is not limited thereto.

The contrast ratio enhancement curve applier 330 may apply, to the first region 910, the fourth contrast ratio enhancement curve 940 corresponding to the first region 910. In addition, a second image may be generated by generating a final contrast ratio enhancement curve for each region included in the first image 301 in the same manner as described above and applying the generated final contrast ratio enhancement curve to each region.

Alternatively, when a fourth contrast ratio enhancement curve is generated for each pixel, a first pixel included in the first image 301 may be included in a second region among a plurality of divided regions and included in a third object region among a plurality of divided object regions. The contrast ratio enhancement curve applier 330 may generate a fourth contrast ratio enhancement curve based on a first contrast ratio enhancement curve, a second contrast ratio enhancement curve corresponding to the second region, and a third contrast ratio enhancement curve corresponding to the third object region. In this case, the contrast ratio enhancement curve applier 330 may determine, as the fourth contrast ratio enhancement curve, a weighted average value of the first contrast ratio enhancement curve, the second contrast ratio enhancement curve corresponding to the second region, and the third contrast ratio enhancement curve corresponding to the third object region but is not limited thereto.

The contrast ratio enhancement curve applier 330 may apply, to the first pixel, the fourth contrast ratio enhancement curve corresponding to the first pixel. In addition, a second image may be generated by generating a final contrast ratio enhancement curve for each pixel included in the first image 301 in the same manner as described above and applying the generated final contrast ratio enhancement curve to each pixel.

Figure 10:
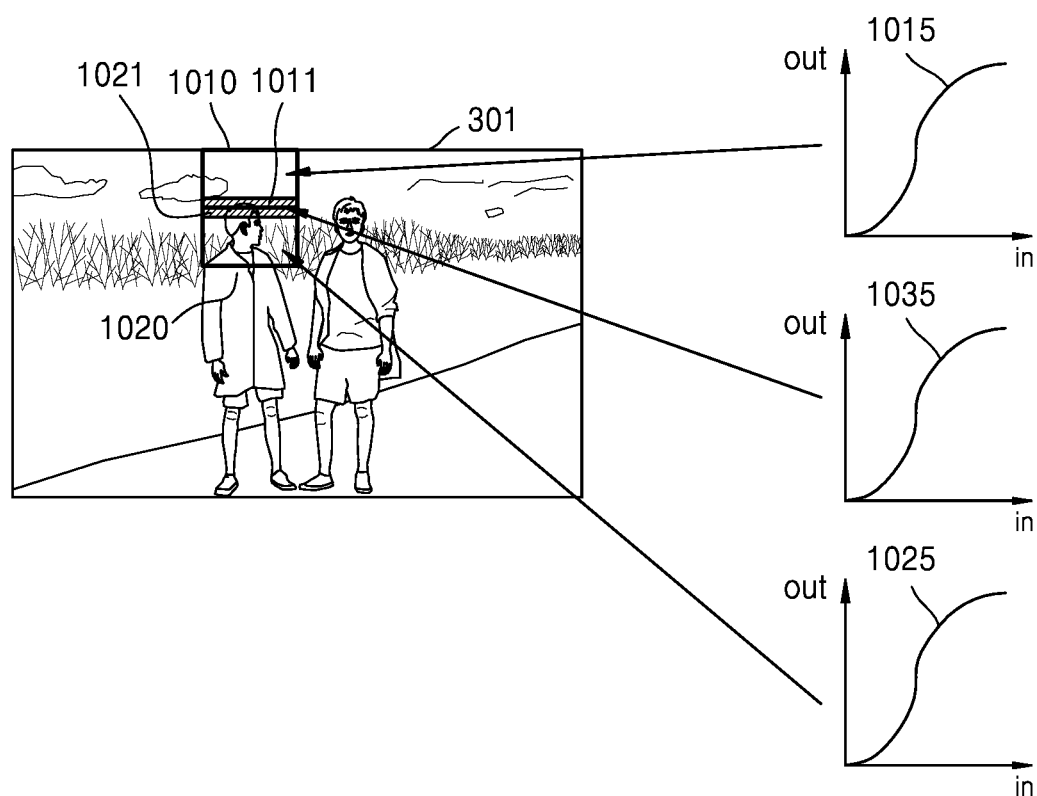
FIG. 10 is referenced to describe a method of applying a contrast ratio enhancement curve, according to an embodiment of the disclosure.

FIG. 10 is referred to describe a method of applying a contrast ratio enhancement curve, according to an embodiment of the disclosure.

When the contrast ratio enhancement curve applier 330 according to an embodiment of the disclosure generates a final contrast ratio enhancement curve for each region included in the first image 301 and applies the generated final contrast ratio enhancement curve to each region, a luminance difference may occur in a boundary between regions. For example, the contrast ratio enhancement curve applier 330 may generate a first final contrast ratio enhancement curve 1015 corresponding to a first region 1010 among a plurality of regions included in the first image 301 and generate a second final contrast ratio enhancement curve 1025 corresponding to a second region 1020. The contrast ratio enhancement curve applier 330 may perform contrast ratio enhancement processing by applying the first final contrast ratio enhancement curve 1015 to pixels included in the first region 1010. In addition, the contrast ratio enhancement curve applier 330 may perform contrast ratio enhancement processing by applying the second final contrast ratio enhancement curve 1025 to pixels included in the second region 1020.

Accordingly, when the first final contrast ratio enhancement curve 1015 is applied to first pixels 1011 located at a boundary of the first region 1010 adjacent to the second region 1020, and the second final contrast ratio enhancement curve 1025 is applied to second pixels 1021 located at a boundary of the second region 1020 adjacent to the first region 1010, a significant luminance difference may occur between the first pixels 1011 and the second pixels 1021. When a significant luminance difference occurs between adjacent pixels, an image may be unnaturally viewed.

The contrast ratio enhancement curve applier 330 according to an embodiment of the disclosure may generate a third final contrast ratio enhancement curve 1035 by interpolating the first final contrast ratio enhancement curve 1015 corresponding to the first region 1010 and the second final contrast ratio enhancement curve 1025 corresponding to the second region 1020. The contrast ratio enhancement curve applier 330 may perform contrast ratio enhancement processing by applying the third final contrast ratio enhancement curve 1035 to the first pixels 1011 and the second pixels 1021, thereby preventing the occurrence of a significant luminance difference between adjacent pixels.

In addition, contrast ratio enhancement processing on pixels located at edges of the second region 1020 may be performed by using final contrast ratio enhancement curves respectively corresponding to a third region (not shown) adjacent to the right of the second region 1020, a fourth region (not shown) adjacent to the left of the second region 1020, and a fifth region (not shown) adjacent to the bottom of the second region 1020, besides the first region 1010.

Regions adjacent to one region may be determined in various ways, and contrast ratio enhancement processing may be performed by applying, to pixels located at boundaries, contrast ratio enhancement curves obtained by interpolating, in various methods, a final contrast ratio enhancement curve of a corresponding region and final contrast ratio enhancement curves corresponding to adjacent regions.

Figure 11:
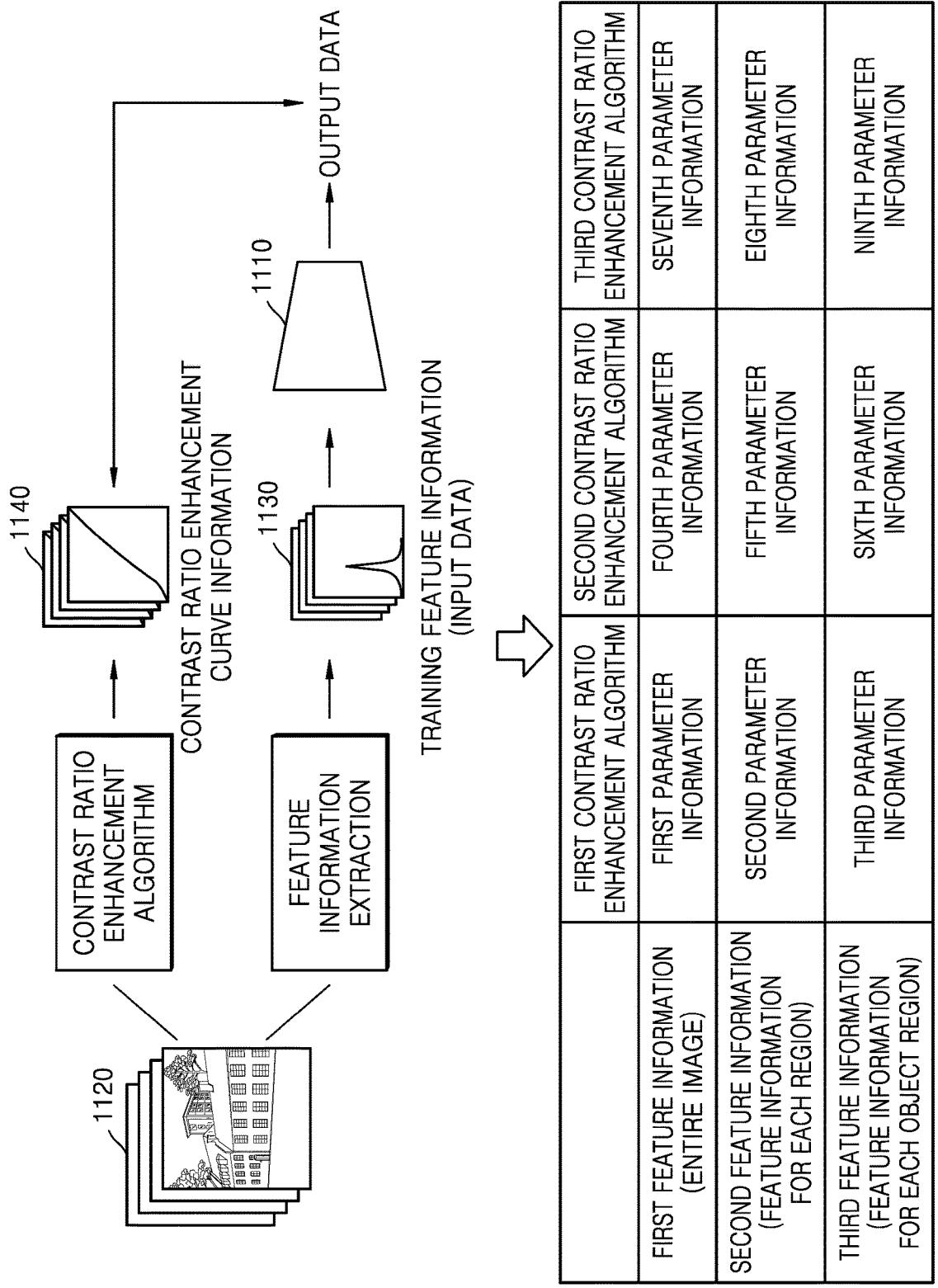
FIG. 11 is referenced to describe a method of obtaining parameter information set to a curve generation network, according to an embodiment of the disclosure.

FIG. 11 is referred to describe a method of obtaining parameter information set to a curve generation network, according to an embodiment of the disclosure.

Referring to FIG. 11, the parameter information according to an embodiment of the disclosure may be determined by an external device, and in this case, the external device may be a separate device other than the display device 100 according to an embodiment of the disclosure. For example, the external device may determine parameters (weights or coefficients) included in a curve generation network 1110 by training the curve generation network 1110 based on a training data set.

The curve generation network 1110 may be a deep neural network (DNN) including a plurality of layers, and for a neural network to correctly output result data corresponding to input data, the neural network may be trained according to purposes. Herein, the term 'training' may indicate training a neural network so that the neural network discovers or masters, without any help, a method of inputting various kinds of data to the neural network and analyzing the input data, a method of classifying the input data, a method of extracting, from the input data, features needed to generate result data, and/or the like. Particularly, through a training process, the neural network may learn training data to optimize and set parameters (weights or coefficients) inside the neural network. The neural network set with the optimized parameters may perform self-learning on input data and output a target result.

The curve generation network 1110 according to an embodiment of the disclosure may be a neural network configured to receive, as an input, feature information of an image or a region and output contrast ratio enhancement curve information (a contrast ratio enhancement curve or points included in the contrast ratio enhancement curve).

The external device may obtain a plurality of pieces of parameter information by training the curve generation network 1110 based on a plurality of training data sets. Herein, the plurality of training data sets may be generated based on a plurality of training images 1120 and a plurality of contrast ratio enhancement algorithms. In addition, one training data set may include training feature information (input data) 1130 extracted from the plurality of training images 1120 and training contrast ratio enhancement curve information 1140 corresponding to the training feature information 1130. Herein, the training contrast ratio enhancement curve information 1140 may be obtained by applying a contrast ratio enhancement algorithm to the plurality of training images 1120.

In addition, the training feature information 1130 may include first training feature information, second training feature information, and third training feature information. For example, the first training feature information may be feature information extracted from each of the plurality of training images 1120. The second training feature information may be feature information of each of a plurality of regions divided from each of the plurality of training images 1120. The third training feature information may be feature information of each of a plurality of object regions divided from each of the plurality of training images 1120.

In addition, training contrast ratio enhancement curve information corresponding to a training image may be differently determined according to a contrast ratio enhancement algorithm applied to the training image even for the same training image. Therefore, a plurality of pieces of training contrast ratio enhancement curve information may correspond to one piece of training feature information.

Particularly, a plurality of pieces of training contrast ratio enhancement curve information corresponding to the first training feature information may be determined according to a contrast ratio enhancement algorithm applied to each of the plurality of training images 1120. For example, first training contrast ratio enhancement curve information may be obtained by applying a first contrast ratio enhancement algorithm to each of the plurality of training images 1120. Accordingly, the external device may obtain a first training data set including the first training feature information and the first training contrast ratio enhancement curve information. The external device may determine first parameter information by training the curve generation network 1110 based on the first training data set.

For example, the external device may determine the first parameter information by updating parameters included in the curve generation network 1110 in a way of minimizing a difference between data (output data), output by inputting the first training feature information to the curve generation network 1110, and the first training contrast ratio enhancement curve information.

In addition, second training contrast ratio enhancement curve information may be obtained by applying a second contrast ratio enhancement algorithm to each of the plurality of training images 1120. Accordingly, the external device may obtain a second training data set including the first training feature information and the second training contrast ratio enhancement curve information. The external device may determine fourth parameter information by training the curve generation network 1110 based on the second training data set.

In addition, third training contrast ratio enhancement curve information may be obtained by applying a third contrast ratio enhancement algorithm to each of the plurality of training images 1120. Accordingly, the external device may obtain a third training data set including the first training feature information and the third training contrast ratio enhancement curve information. The external device may determine seventh parameter information by training the curve generation network 1110 based on the third training data set.

In the same manner as described above, contrast ratio enhancement curve information corresponding to the second training feature information may also be differently obtained according to a contrast ratio enhancement algorithm applied to each of a plurality of divided regions. For example, fourth contrast ratio enhancement curve information may be obtained by applying the first contrast ratio enhancement algorithm to each of the plurality of divided regions, fifth contrast ratio enhancement curve information may be obtained by applying the second contrast ratio enhancement algorithm to each of the plurality of divided regions, and sixth contrast ratio enhancement curve information may be obtained by applying the third contrast ratio enhancement algorithm to each of the plurality of divided regions.

Accordingly, the external device may obtain a fourth training data set including the second training feature information and the fourth contrast ratio enhancement curve information, a fifth training data set including the second training feature information and the fifth contrast ratio enhancement curve information, and a sixth training data set including the second training feature information and the sixth contrast ratio enhancement curve information.

The external device may determine second parameter information by training the curve generation network 1110 based on the fourth training data set. The external device may determine fifth parameter information by training the curve generation network 1110 based on the fifth training data set and determine eighth parameter information by training the curve generation network 1110 based on the sixth training data set.

In addition, contrast ratio enhancement curve information corresponding to the third training feature information may also be differently obtained according to a contrast ratio enhancement algorithm applied to each of a plurality of object regions. For example, seventh contrast ratio enhancement curve information may be obtained by applying the first contrast ratio enhancement algorithm to each of the plurality of object regions, eighth contrast ratio enhancement curve information may be obtained by applying the second contrast ratio enhancement algorithm to each of the plurality of object regions, and ninth contrast ratio enhancement curve information may be obtained by applying the third contrast ratio enhancement algorithm to each of the plurality of object regions.

Accordingly, the external device may obtain a seventh training data set including the third training feature information and the seventh contrast ratio enhancement curve information, an eighth training data set including the third training feature information and the eighth contrast ratio enhancement curve information, and a ninth training data set including the third training feature information and the ninth contrast ratio enhancement curve information.

The external device may determine third parameter information by training the curve generation network 1110 based on the seventh training data set. The external device may determine sixth parameter information by training the curve generation network 1110 based on the eighth training data set and determine ninth parameter information by training the curve generation network 1110 based on the ninth training data set.

The display device 100 according to an embodiment of the disclosure may receive parameter information from the external device. In this case, the display device 100 may receive parameter information obtained by training the curve generation network 1110 with training data obtained by applying a contrast ratio enhancement algorithm optimized to the display characteristic of the display device 100.

For example, when the contrast ratio enhancement algorithm optimized to the display characteristic of the display included in the display device 100 is the first contrast ratio enhancement algorithm, the display device 100 may receive the first parameter information, the second parameter information, and the third parameter information from the external device.

Alternatively, when the contrast ratio enhancement algorithm optimized to the display characteristic of the display included in the display device 100 is the second contrast ratio enhancement algorithm, the display device 100 may receive the fourth parameter information, the fifth parameter information, and the sixth parameter information from the external device.

Figure 12:
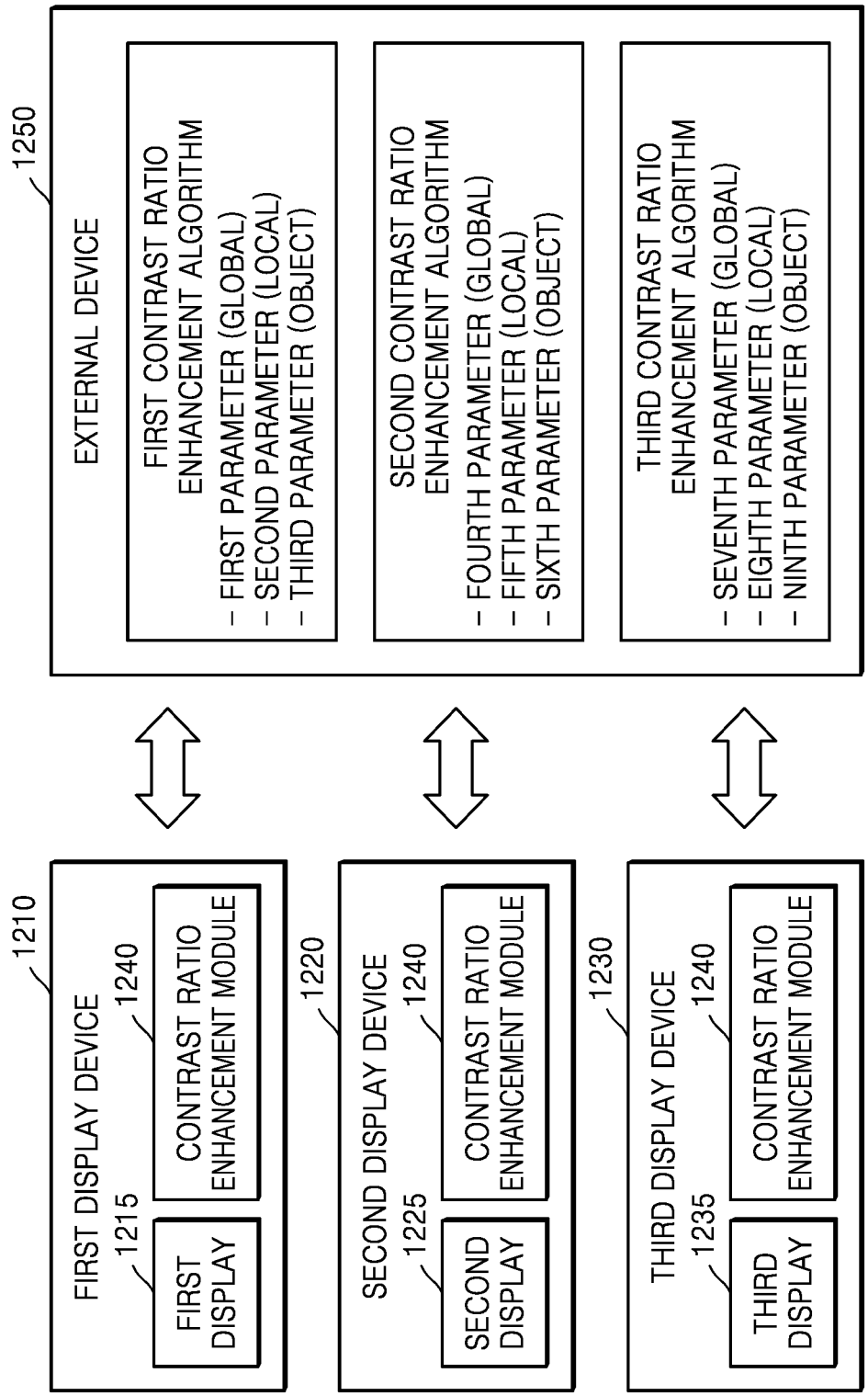
FIG. 12 is referenced to describe a method, performed by a plurality of display devices, of performing contrast ratio enhancement processing by using the same contrast ratio enhancement module (device), according to an embodiment of the disclosure.

FIG. 12 is referred to describe a method, performed by a plurality of display devices, of performing contrast ratio enhancement processing by using the same contrast ratio enhancement module (device), according to an embodiment of the disclosure.

Referring to FIG. 12, the plurality of display devices, e.g., a first display device 1210, a second display device 1220, and a third display device 1230, according to an embodiment of the disclosure may include displays having different display characteristics. The first display device 1210 may include a first display 1215, and the first display 1215 may include a self-emission display such as an organic light-emitting diode (OLED) or a micro light-emitting diode (LED). Accordingly, the first display 1215 may have a first display characteristic (e.g., a self-emission characteristic).

In addition, the second display device 1220 may include a second display 1225, and the second display 1225 may include a non-self-emission display such as a liquid crystal display (LCD). Accordingly, the second display 1225 may have a second display characteristic (e.g., a non-self-emission characteristic).

In addition, the third display device 1230 may include a third display 1235, and the third display 1235 may be a display different from a self-emission display and a non-self-emission display. For example, the third display device 1230 may include a laser projector using a screen, or the like. Accordingly, the third display device 1230 may have a third display characteristic, and the first display characteristic, the second display characteristic, and the display characteristic may be different from each other.

When the plurality of display devices 1210, 1220, and 1230 according to an embodiment of the disclosure perform contrast ratio enhancement processing on an input image, it may be needed to apply different contrast ratio enhancement algorithms optimized to display characteristics. For example, contrast ratio enhancement processing on a low gray-scale region is significant for a display having the non-self-emission characteristic because the display emits light by using a backlight unit, while techniques of enhancing a contrast ration with efficient power are needed for a display having the self-emission characteristic because it is not easy to represent a higher luminance than that of the display having the non-self-emission characteristic.

When the same contrast ratio enhancement algorithm is applied to the plurality of display devices 1210, 1220, and 1230 having different display characteristics, it is difficult to optimize contrast ratio enhancement processing according to the display characteristics. Therefore, the plurality of display devices 1210, 1220, and 1230 needs a contrast ratio enhancement module (device, or processor) to which different contrast ratio enhancement algorithms are applied according to the display characteristics.

The plurality of display devices 1210, 1220, and 1230 according to an embodiment of the disclosure may include the same contrast ratio enhancement module 1240, and the contrast ratio enhancement module 1240 may be the device 300 configured to perform contrast ratio enhancement processing, which is shown in and described with reference to FIG. 3. However, the present embodiment is not limited thereto.

The contrast ratio enhancement module 1240 according to an embodiment of the disclosure may include a curve generation network configured to generate a contrast ratio enhancement curve needed for contrast ratio enhancement processing. In this case, parameter information set to parameters (weights or coefficients) included in the curve generation network may vary according to a display characteristic, and an effect of performing contrast ratio enhancement processing by applying different contrast ratio enhancement algorithms may be exhibited by differently setting the parameters included in the curve generation network to perform the contrast ratio enhancement processing.

Each of the plurality of display devices 1210, 1220, and 1230 according to an embodiment of the disclosure may receive parameter information determined using an optimized contrast ratio enhancement algorithm, according to a display characteristic.

Referring to FIG. 12, an external device 1250 may obtain parameter information set to the curve generation network by training the curve generation network with training data, as shown in and described with reference to FIG. 11.

For example, the external device 1250 may obtain the first parameter information, the second parameter information, and the third parameter information by training the curve generation network with training data to which the first contrast ratio enhancement algorithm is applied. In addition, the external device 1250 may obtain the fourth parameter information, the fifth parameter information, and the sixth parameter information by training the curve generation network with training data to which the second contrast ratio enhancement algorithm is applied. In addition, the external device 1250 may obtain the seventh parameter information, the eighth parameter information, and the ninth parameter information by training the curve generation network with training data to which the third contrast ratio enhancement algorithm is applied.

A method, performed by the external device 1250, of obtaining the first to ninth pieces of parameter information has been described in detail with reference to FIG. 11, and thus, a detained description thereof is omitted herein.

Referring back to FIG. 12, the first display 1215 included in the first display device 1210 has the self-emission characteristic, and a contrast ratio enhancement algorithm optimized to the self-emission characteristic may be the first contrast ratio enhancement algorithm. The first display device 1210 may receive the first parameter information, the second parameter information, and the third parameter information from the external device 1250. The first display device 1210 may generate a global contrast ratio enhancement curve, local contrast ratio enhancement curves, and object contrast ratio enhancement curves by using the first parameter information, the second parameter information, and the third parameter information. The first display device 1210 may generate a contrast ratio-enhanced output image by applying the global contrast ratio enhancement curve, the local contrast ratio enhancement curves, and the object contrast ratio enhancement curves to an input image and output the contrast ratio-enhanced output image to the first display 1215.

In addition, the second display 1225 included in the second display device 1220 has the non-self-emission characteristic, and a contrast ratio enhancement algorithm optimized to the non-self-emission characteristic may be the second contrast ratio enhancement algorithm. The second display device 1220 may receive the fourth parameter information, the fifth parameter information, and the sixth parameter information from the external device 1250. The second display device 1220 may generate a global contrast ratio enhancement curve, local contrast ratio enhancement curves, and object contrast ratio enhancement curves by using the fourth parameter information, the fifth parameter information, and the sixth parameter information. The second display device 1220 may generate a contrast ratio-enhanced output image by applying the global contrast ratio enhancement curve, the local contrast ratio enhancement curves, and the object contrast ratio enhancement curves to an input image and output the contrast ratio-enhanced output image to the second display 1225.

The contrast ratio enhancement module 1240 including the curve generation network according to an embodiment of the disclosure may be implemented in a form of system on chip (SoC), and the plurality of display devices 1210, 1220, and 1230 may include the same SoC. Accordingly, the same SoC may be applied to the plurality of display devices 1210, 1220, and 1230 having different display characteristics, and thus, manufacturing costs of display devices may be reduced.

In addition, each of the plurality of display devices 1210, 1220, and 1230 may perform contrast ratio enhancement processing optimized according to a display characteristic, by using the same contrast ratio enhancement module 1240. In addition, when a contrast ratio enhancement algorithm is changed or updated, the external device 1250 may obtain new parameter information by training the curve generation network with training data to which the changed or updated contrast ratio enhancement algorithm is applied, and a display device may receive the new parameter information and use the new parameter information for contrast ratio enhancement processing.

FIG. 13 is a block diagram of the display device according to an embodiment of the disclosure.

Referring to FIG. 13, the display device 100 according to an embodiment of the disclosure may include an image receiver 110, a processor 120, a memory 130, and a display 140.

The image receiver 110 according to an embodiment of the disclosure may include a communication interface, an input/output interface, and the like. For example, the communication interface may transmit and receive data or a signal to and from an external device or a server. For example, the communication interface may include a Wi-Fi module, a Bluetooth module, an infrared communication module, a wireless communication module, a local area network (LAN) module, an Ethernet module, a wired communication module, and the like. Herein, each communication module may be implemented in a form of at least one hardware chip.

The Wi-Fi module and the Bluetooth module perform communication by a Wi-Fi scheme and a Bluetooth scheme, respectively. When the Wi-Fi module or the Bluetooth module is used, various kinds of connection information such as a service set identifier (SSID) and a session key may be first transmitted and received, communication may be connected by using the various kinds of connection information, and then various kinds of information may be transmitted and received. The wireless communication module may include at least one communication chip configured to perform communication according to various wireless communication standards such as Zigbee, $3^{rd}$ Generation (3G), $3^{rd}$ Generation Partnership Project (3GPP), Long Term Evolution (LTE), LTE Advanced (LTE-A), $4^{th}$ Generation (4G), and $5^{th}$ Generation (5G).

In addition, the input/output interface receives a video (e.g., a moving picture, and the like), audio (e.g., voice, music, and the like), and additional information (e.g., electronic program guide (EPG) and the like) from the outside of the display device 100. The input/output interface may include at least one of a high-definition multimedia interface (HDMI) port, a mobile high-definition link (MHL) port, a universal serial bus (USB) port, a display port (DP), a thunderbolt port, a video graphics array (VGA) port, an RGB port, a D-subminiature (D-SUB) port, a digital visual interface (DVI) port, a component jack, or a PC port.

The image receiver 110 according to an embodiment of the disclosure may receive one more images.

The processor 120 according to an embodiment of the disclosure may control a general operation of the display device 100 and a signal flow between internal components of the display device 100 and perform a data processing function.

The processor 120 may include a single core, dual cores, triple cores, quadruple cores, or cores of a multiple thereof. In addition, the processor 120 may include a plurality of processors. For example, the processor 120 may be implemented by a main processor (not shown), and a sub-processor (not shown) operating in a sleep mode.

In addition, the processor 120 may include at least one of a central processing unit (CPU), a graphics processing unit (GPU), or a video processing unit (VPU). Alternatively, according to embodiments of the disclosure, the processor 120 may be implemented in the form of a SoC including at least one of the CPU, the GPU, or the VPU.

The memory 130 according to an embodiment of the disclosure may store various data, programs, or applications to operate and control the display device 100.

In addition, a program stored in the memory 130 may include one or more instructions. The program (one or more instructions) or an application stored in the memory 130 may be executed by the processor 120.

The processor 120 according to an embodiment of the disclosure may include at least one of components included in the device (or module) 300, of FIG. 3, configured to perform contrast ratio enhancement processing.

The processor 120 according to an embodiment of the disclosure may extract first feature information, second feature information, and third feature information corresponding to a received first image. For example, the first feature information may indicate a characteristic of the entire region of the first image, and the second feature information may indicate a characteristic of each of a plurality of regions included in the first image. In addition, the third feature information may indicate a characteristic of each of a plurality of object regions included in the first image. Herein, the characteristic of the entire region or a partial region of the first image may include histograms, average values, median values, minimum/maximum values, and the like indicating luminance information, RGB information, frequency information, and noise information of pixels included in the entire region or the partial region of the first image but is not limited thereto.

The processor 120 may generate a first contrast ratio enhancement curve (global contrast ratio enhancement curve) based on the first feature information and first parameter information. For example, the processor 120 may obtain first contrast ratio enhancement curve information (the first contrast ratio enhancement curve or points included in the first contrast ratio enhancement curve) as an output by setting, as the first parameter information received from the external device, parameters (weights or coefficients) of nodes included in a curve generation network and inputting the first feature information to the curve generation network in which the first parameter information is set. In addition, the processor 120 may generate the first contrast ratio enhancement curve based on the first contrast ratio enhancement curve information.

In addition, the processor 120 may generate a second contrast ratio enhancement curve (local contrast ratio enhancement curve) based on the second feature information and second parameter information in the same method as the method of generating the first contrast ratio enhancement curve. In addition, the processor 120 may generate a third contrast ratio enhancement curve (object contrast ratio enhancement curve) based on the third feature information and third parameter information in the same method as the method of generating the first contrast ratio enhancement curve.

The processor 120 may generate a second image by applying the first contrast ratio enhancement curve, the second contrast ratio enhancement curve, and the third contrast ratio enhancement curve to the first image.

For example, the processor 120 may generate the second image by sequentially applying the first contrast ratio enhancement curve, the second contrast ratio enhancement curve, and the third contrast ratio enhancement curve to the first image. Alternatively, the processor 120 may generate a fourth contrast ratio enhancement curve based on the first contrast ratio enhancement curve, the second contrast ratio enhancement curve, and the third contrast ratio enhancement curve. Herein, the fourth contrast ratio enhancement curve may be a weighted sum of the first contrast ratio enhancement curve, the second contrast ratio enhancement curve, and the third contrast ratio enhancement curve but is not limited thereto. In addition, the fourth contrast ratio enhancement curve may be generated for each pixel included in the first image but is not limited thereto. The processor 120 may generate the second image by applying the fourth contrast ratio enhancement curve to the first image.

The processor 120 may control the display 140 to display the second image.

The display 140 according to an embodiment of the disclosure may generate a driving signal by converting an image signal, a data signal, an on screen display (OSD) signal, a control signal, or the like processed in the processor 120. The display 140 may be implemented by a plasma display panel (PDP), an LCD, an OLED, a flexible display, a three-dimensional (3D) display, or the like. In addition, the display 140 may include a touch screen and be used as an input device besides an output device.

The display 140 according to an embodiment of the disclosure may display the second image of which a contrast ratio has been enhanced.

FIG. 14 is a block diagram of the display device according to another embodiment of the disclosure.

Referring to FIG. 14, the display device 1400 of FIG. 14 may be an embodiment of the display device 100 described with reference to FIGS. 1 to 11.

Referring to FIG. 14, the display device 1400 according to an embodiment of the disclosure may include a tuner 1440, a processor 1410, a display 1420, a communication interface 1450, a sensor 1430, an input/output interface 1470, a video processor 1480, an audio processor 1485, an audio output interface 1460, a memory 1490, and a power supply 1495.

The communication interface 1450 of FIG. 14 corresponds to the communication interface included in the image receiver 110 of FIG. 13, the input/output interface 1470 of FIG. 14 corresponds to the input/output interface included in the image receiver 110 of FIG. 13, and the processor 1410, the memory 1490, and the display 1420 of FIG. 14 correspond to the processor 120, the memory 130, and the display 140 of FIG. 13, respectively. Therefore, the same description as made with reference to FIG. 13 is not repeated herein.

The tuner 1440 according to an embodiment of the disclosure may tune and select only a frequency of a channel to be received by the display device 1400, from among a lot of frequency components through amplification, mixing, resonance, and the like of a broadcast signal received in a wired or wireless manner. The broadcast signal may include audio, video, and additional information (e.g., EPG).

The tuner 1440 may receive the broadcast signal from various sources such as a terrestrial broadcasting station, a cable broadcasting station, a satellite broadcasting station, and an Internet broadcasting station. The tuner 1440 may also receive the broadcast signal from a source such as an analog broadcasting station or a digital broadcasting station.

The sensor 1430 senses a voice of a user, an image of the user, or an interaction of the user and may include a microphone 1431, a camera 1432, and a light receiver 1433.

The microphone 1431 receives a voice uttered from the user. The microphone 1431 may convert the received voice into an electrical signal and output the electrical signal to the processor 1410. The user's voice may include, for example, a voice corresponding to a menu or a function of the display device 1400.

The camera 1432 may receive a video (e.g., consecutive frames) corresponding to the user's motion including a gesture within a camera recognition range. The processor 1410 may select a menu displayed on the display device 1400 or perform a control corresponding to a motion recognition result, by using a recognition result of the received motion.

The light receiver 1433 receives an optical signal (including a control signal) received from an external control device, through an optical window (not shown) of a bezel of the display 1420, or the like. The light receiver 1433 may receive an optical signal corresponding to a user input (e.g., a touch, a press, a touch gesture, a voice, or a motion) from a control device. A control signal may be extracted from the received optical signal under control by the processor 1410.

The processor 1410 controls a general operation of the display device 1400 and a signal flow between internal components of the display device 1400 and performs a data processing function. The processor 1410 may execute an operating system (OS) and various applications stored in the memory 1490 when a user input is received or when a previously set and stored condition is satisfied.

The processor 1410 may include random access memory (RAM) storing a signal or data input from the outside of the display device 1400 or used as a storage region corresponding to various tasks to be performed by the display device 1400, read only memory (ROM) storing a control program for a control of the display device 1400, and a processor.

The video processor 1480 processes video data received by the display device 1400. The video processor 1480 may perform various kinds of image processing such as decoding, scaling, noise removal, frame rate conversion, and resolution conversion on the video data.

The audio processor 1485 processes audio data. The audio processor 1485 may perform various kinds of processing such as decoding, amplification, and noise removal on the audio data. The audio processor 1485 may include a plurality of audio processing modules to process audio corresponding to a plurality of pieces of content.

The audio output interface 1460 outputs audio included in a broadcast signal received through the tuner 1440, under control by the processor 1410. The audio output interface 1460 may output audio (e.g., a voice or a sound) input through the communication interface 1450 or the input/output interface 1470. In addition, the audio output interface 1460 may output audio stored in the memory 1490, under control by the processor 1410. The audio output interface 1460 may include at least one of a speaker, a headphone output terminal, or a Sony/Philips digital interface (S/PDIF) output terminal.

The power supply 1495 supplies power input from an external power source to the internal components of the display device 1400, under control by the processor 1410. Alternatively, the power supply 1495 may supply power output from one or more batteries (not shown) located inside the display device 1400 to the internal components, under control by the processor 1410.

The memory 1490 may store various kinds of data, programs, or applications for driving and controlling the display device 1400, under control by the processor 1410. The memory 1490 may include a broadcast reception module, a channel control module, a volume control module, a communication control module, a voice recognition module, a motion recognition module, a light reception module, a display control module, an audio control module, an external input control module, a power control module, a module for controlling power of an external device connected in a wireless manner (e.g., Bluetooth), a voice database (DB), or a motion DB, which are not shown. The not-shown modules and DBs of the memory 1490 may be implemented in a software form to perform, in the display device 1400, a broadcast reception control function, a channel control function, a volume control function, a communication control function, a voice recognition function, a motion recognition function, a light reception control function, a display control function, an audio control function, an external input control function, a power control function, or a function of controlling power of an external device connected in a wireless manner (e.g., Bluetooth). The processor 1410 may perform each function by using the software stored in the memory 1490.

The block diagrams of the display devices 100 and 1400 shown in FIGS. 13 and 14 are only illustrative. Each component of the block diagrams may be integrated, added, or omitted according to the specification of the electronic devices 100 and 1400 actually implemented. That is, in accordance with circumstances, two or more components may be integrated into one component, or one component may be divided into two or more components. In addition, a function performed by each block is to describe embodiments, and a particular operation or device thereof does not limit the right scope of the disclosure.

A method of operating a display device, according to an embodiment of the disclosure, may be implemented in a form of program commands executable by various computer means and recorded on a non-transitory computer-readable recording medium. The non-transitory computer-readable recording medium may include program commands, data files, data structures, and the like, taken alone or in combination. The program commands recorded on the non-transitory computer-readable recording medium may be specially designed and constructed for the disclosure or may be known to and usable by one of ordinary skill in a field of computer software. Examples of the non-transitory computer-readable recording medium include magnetic media, e.g., hard discs, floppy discs, or magnetic tapes, optical media, e.g., compact disc-read only memories (CD-ROMs), or digital versatile discs (DVDs), magneto-optical media, e.g., floptical discs, and hardware devices that are specially configured to store and carry out program commands, e.g., ROMs, RAMs, or flash memories. Examples of the program commands include a high-level language code that may be executed by a computer using an interpreter as well as a machine language code made by a complier.

In addition, a method of operating an electronic device, according to the embodiments, may be provided by being included in a computer program product. The computer program product may be traded between a seller and a purchaser.

The computer program product may include a software (S/W) program and a non-transitory computer-readable storage medium in which the S/W program is stored. For example, the computer program product may include a S/W program form of product (e.g., a downloadable application) electronically distributed through a manufacturing company of the electronic device or an electronic market (e.g., Google PlayStore, or App Store). For the electronic distribution, at least a portion of the SAN program may be stored in a storage medium or temporarily generated. In this case, the storage medium may be included in a server of the manufacturing company, a server of the electronic market, or a relay server configured to temporarily store the S/W program.

The computer program product may include a storage medium of a server or a storage medium of a client device in a system including the server and the client device. Alternatively, when a third device (e.g., a smartphone) connected to the server or the client device through communication exists, the computer program product may include a storage medium of the third device. Alternatively, the computer program product may include the SAN program to be transmitted from the server to the client device or the third device or transmitted from the third device to the client device.

In this case, one of the server, the client device, and the third device may execute the computer program product and perform the methods according to the embodiments. Alternatively, two or more of the server, the client device, and the third device may execute the computer program product and perform the methods according to the embodiments in a distributed fashion.

For example, a server (e.g., a cloud server or an artificial intelligence server) may execute a computer program product stored in the server to control a client device connected to the server through communication, wherein the client device performs the methods according to the disclosed embodiments.

While the embodiments have been described in detail, the right scope of the disclosure is not limited thereto, and various modified and improved forms of those of ordinary skill in the art using the basis concept of the disclosure defined in the claims also belong to the right scope of the disclosure.

What is claimed is:

1. A display device comprising:
a display;
a memory storing one or more instructions; and
a processor configured to execute the one or more instructions stored in the memory to:
extract first feature information corresponding to a first image, second feature information corresponding to each of a plurality of regions included in the first image, and third feature information corresponding to each of a plurality of object regions included in the first image,
obtain a first contrast ratio enhancement curve corresponding to the first image, the first contrast ratio enhancement curve being generated by applying the first feature information to a curve generation network in which first parameter information is set,
obtain a second contrast ratio enhancement curve corresponding to each of the plurality of regions, the second contrast ratio enhancement curve being generated by applying the second feature information to the curve generation network in which second parameter information is set,
obtain a third contrast ratio enhancement curve corresponding to each of the plurality of object regions, the third contrast ratio enhancement curve being generated by applying the third feature information to the curve generation network in which third parameter information is set,
generate a second image by applying the first contrast ratio enhancement curve to the first image, applying the second contrast ratio enhancement curve to each of the plurality of regions included in the first image, and applying the third contrast ratio enhancement curve to each of the plurality of object regions included in the first image, and
control the display to display the second image.

2. The display device of claim 1, wherein the processor is further configured to extract one or more objects from the first image, and obtain the plurality of object regions included in the first image by dividing the first image into the plurality of object regions based on the extracted one or more objects.

3. The display device of claim 1, wherein the first feature information, the second feature information, and the third feature information are determined based on at least one of luminance information, RGB information, frequency information, or noise information of pixels included in the first image.

4. The display device of claim 1, wherein the first parameter information, the second parameter information, and the third parameter information are determined by training the curve generation network based on training data obtained using a contrast ratio enhancement algorithm according to a display characteristic of the display.

5. The display device of claim 4, wherein the training data comprises feature information extracted from a plurality of training images, and contrast ratio enhancement curve information obtained by applying the contrast ratio enhancement algorithm to the plurality of training images.

6. The display device of claim 1, wherein the processor generates the second image by sequentially applying the first contrast ratio enhancement curve, the second contrast ratio enhancement curve, and the third contrast ratio enhancement curve to the first image.

7. The display device of claim 1, wherein the processor is further configured to:
obtain a fourth contrast ratio enhancement curve based on the first contrast ratio enhancement curve, the second contrast ratio enhancement curve, and the third contrast ratio enhancement curve,
wherein the second image is generated by applying the fourth contrast ratio enhancement curve to the first image.

8. The display device of claim 7, wherein the processor generates the fourth contrast ratio enhancement curve by using a weighted average method to synthesize the first contrast ratio enhancement curve, the second contrast ratio enhancement curve, and the third contrast ratio enhancement curve.

9. The display device of claim 7, wherein the processor is further configured to generate the fourth contrast ratio enhancement curve for each of the plurality of regions,
generate a fifth contrast ratio enhancement curve by interpolating a fourth contrast ratio enhancement curve corresponding to a first region among the plurality of regions and a fourth contrast ratio enhancement curve corresponding to a second region adjacent to the first region, and
generate the second image by applying the fifth contrast ratio enhancement curve to pixels in a boundary between the first region and the second region.

10. An operating method of a display device, the operating method comprising:
receiving a first image;
extracting first feature information corresponding to the first image, second feature information corresponding to each of a plurality of regions included in the first image, and third feature information corresponding to each of a plurality of object regions included in the first image;
obtaining a first contrast ratio enhancement curve corresponding to the first image, the first contrast ratio enhancement curve being generated by applying the first feature information to a curve generation network in which first parameter information is set;
obtaining a second contrast ratio enhancement curve corresponding to each of the plurality of regions, the second contrast ratio enhancement curve being generated by applying the second feature information to the curve generation network in which second parameter information is set;
obtaining a third contrast ratio enhancement curve corresponding to each of the plurality of object regions, the third contrast ratio enhancement curve being generated by applying the third feature information to the curve generation network in which third parameter information is set;
generating a second image by applying the first contrast ratio enhancement curve to the first image, applying the second contrast ratio enhancement curve to each of the plurality of regions included in the first image, and applying the third contrast ratio enhancement curve to each of the plurality of object regions included in the first image; and displaying the second image.

11. The operating method of claim 10, further comprising:
extracting one or more objects from the first image, and
obtaining the plurality of object regions included in the first image by dividing the first image into the plurality of object regions based on the extracted one or more objects.

12. The operating method of claim 10, wherein the extracting of the first feature information, the second feature information, and the third feature information comprises determining the first feature information, the second feature information, and the third feature information based on at least one of luminance information, RGB information, frequency information, or noise information of pixels included in the first image.

13. The operating method of claim 10, wherein the first feature information, the second feature information, and the third feature information are determined by training the curve generation network based on training data obtained using a contrast ratio enhancement algorithm according to a display characteristic of the display device.

14. The operating method of claim 13, wherein the training data comprises feature information extracted from a plurality of training images, and contrast ratio enhancement curve information obtained by applying the contrast ratio enhancement algorithm to the plurality of training images.

15. A non-transitory computer-readable recording medium storing therein a program for performing the operating method of claim 10.

* * * * *